(12) United States Patent
Abou-Fadel et al.

(10) Patent No.: US 11,098,889 B2
(45) Date of Patent: Aug. 24, 2021

(54) LIGHTING SYSTEM AND METHOD FOR OPERATING LIGHTING SYSTEM

(71) Applicants: Simon Anthony Abou-Fadel, Québec (CA); Craig Webster, Plano, TX (US)

(72) Inventors: Simon Anthony Abou-Fadel, Québec (CA); Craig Webster, Plano, TX (US)

( * ) Notice: Subject to any disclaimer, the term of this patent is extended or adjusted under 35 U.S.C. 154(b) by 0 days.

(21) Appl. No.: 16/875,966

(22) Filed: May 15, 2020

(65) Prior Publication Data
US 2020/0278110 A1    Sep. 3, 2020

Related U.S. Application Data

(63) Continuation of application No. 15/991,990, filed on May 29, 2018, now Pat. No. 10,788,200.
(Continued)

(51) Int. Cl.
| | |
|---|---|
| *F21V 33/00* | (2006.01) |
| *H04N 5/232* | (2006.01) |
| *H04N 5/225* | (2006.01) |
| *H04N 5/235* | (2006.01) |
| *G06F 1/16* | (2006.01) |
| *G06K 9/00* | (2006.01) |

(Continued)

(52) U.S. Cl.
CPC ........ *F21V 33/0052* (2013.01); *G06F 1/1616* (2013.01); *G06F 1/1632* (2013.01); *G06K 9/00228* (2013.01); *G06K 9/2027* (2013.01); *H04N 5/2256* (2013.01); *H04N 5/2351* (2013.01); *H04N 5/2354* (2013.01); *H04N 5/232127* (2018.08); *H04N 7/142* (2013.01); *F21Y 2115/10* (2016.08); *H04N 7/15* (2013.01)

(58) Field of Classification Search
None
See application file for complete search history.

(56) References Cited

U.S. PATENT DOCUMENTS

| | | |
|---|---|---|
| 5,648,814 A | 7/1997 | Munson |
| 6,344,874 B1 | 2/2002 | Helms et al. |

(Continued)

FOREIGN PATENT DOCUMENTS

WO    WO2017066280 A1    4/2017

OTHER PUBLICATIONS

BrightLine Catalogue—Overview—Enabling communication though clarity, 76 pages (2016).
(Continued)

*Primary Examiner* — Ahn Q Tran
(74) *Attorney, Agent, or Firm* — Winston & Strawn LLP

(57) ABSTRACT

The contemplated system allows users to engage in a recording activity with studio quality light. Because the system is portable and easily deployable, the system can be carried to and quickly set up by the user in any location where the recording will occur. The system includes a lighting instrument that can be installed on the display with the web camera exposed. The lighting instrument includes a light source configuration that can reduce lens flare. The system allows for operation as a dock station when not deployed. The contemplated method allows users to operate the system. The method helps the user achieve the optimal light intensity and angle for the recording area with reduced time and efforts. The method may consider distance, ambient light, location of the subject and other factors in its determination. The method allows users to further adjust the intensity and angle if necessary.

20 Claims, 19 Drawing Sheets

Related U.S. Application Data

(60) Provisional application No. 62/512,596, filed on May 30, 2017.

(51) Int. Cl.
  *G06K 9/20* (2006.01)
  *H04N 7/14* (2006.01)
  *H04N 7/15* (2006.01)
  *F21Y 115/10* (2016.01)

(56) References Cited

U.S. PATENT DOCUMENTS

| | | |
|---|---|---|
| 6,575,593 B2 | 6/2003 | Krietzman |
| 6,980,697 B1 | 12/2005 | Basso et al. |
| 6,987,875 B1 | 1/2006 | Silber et al. |
| 7,369,903 B2 | 5/2008 | Diederiks et al. |
| 7,619,366 B2 | 11/2009 | Diederiks |
| 7,631,979 B1 | 12/2009 | Brown et al. |
| 7,652,716 B2 | 1/2010 | Qui et al. |
| 8,134,307 B2 | 3/2012 | Fontijn |
| 8,384,754 B2 | 2/2013 | Goodman |
| 8,432,675 B2 | 4/2013 | Lev et al. |
| 8,467,001 B2 | 6/2013 | Chen et al. |
| 8,500,293 B2 | 8/2013 | Sutton et al. |
| 8,676,045 B1 | 3/2014 | Sawatzky et al. |
| 8,905,592 B2 | 12/2014 | Scruggs et al. |
| 2007/0002130 A1 | 1/2007 | Hartkop |
| 2007/0139515 A1 | 6/2007 | Du Breuil |
| 2008/0246833 A1 | 10/2008 | Yasui et al. |
| 2010/0321467 A1 | 12/2010 | Goodman |
| 2015/0334258 A1 | 11/2015 | O'Neill |
| 2015/0362148 A1 | 12/2015 | Katz |
| 2017/0102116 A1 | 4/2017 | Sherry et al. |
| 2018/0343374 A1 | 11/2018 | Tamura |

OTHER PUBLICATIONS

Website: Avaya Scopia XT Video Conferencing | HD Video Collaboration Software, 6 pages (2018) http://www.avaya.com/usa/product/avaya-scopia-xt-video-conferencing/#.

Website: Video Conferencing & Collaboration—Highfive, 1 page (2018) https://highfive.com.

Website: Innovative LED Lighting for Stills and Video | B&H Explora, 10 pages, (2018) http://www.bhphotovideo.com/explora/photography/hands-review/innovative-led-lighting-stills-and-video.

Website: Video Conferencing Solutions | Polycom—HD Video Conference Equipment, Video Call, 10 pages (2018) http://www.polycom.com/hd-video-conferencing.html.

Website: i-Series | Brightline | Videoconferencing and Studio Lighting, 1 page (2018) http://brightlines.com/videoconferencing/i-series/.

Website: Video Calling 3: Brightlines I/S-22 LED Conference Lamp, 7 pages (2013) http://www.mgraves.org/2013/08/video-calling-3-brightlines-is-22-led-lamp/.

LED Ring Light with Stand, Table Top Halo Light Ring, Live Video Lighting Kit Bi-Color Dimmable CRI 90+ Adjustable [Retrieved Feb. 21, 2020) 11 pages https://www.amazon.com/dp/B07DJ95MM8/ref=sspa_dk_detail_5?psc=1&pd_rd_i=B07DJ95MM8&pd_rd_w=oia5R&pf_rd_p=8a8f3917-7900-4ce8-ad90-adf0d53c0985&pd_rd_wg=hTWVs&pf_rd_r=R6ZRJ8R0Z3DTWHADGNNE&pd_rd_r=521925b3-7348-11e9-.

Glorious-Lite 5W LED Clip on Light/Reading Light/Bed Light, 2-Level Brightness & 2 Color, Eye-Caring Clip on Lamp for Makeup Mirror [Retrieved Feb. 21, 2020) 10 pages https://www.amazon.com/Glorious-Lite-Brightness-Eye-Caring-Headboard-Computer/dp/B07FPKG6R7/ref=sr_1_12?gclid=EAIaIQobChMl4cix95OR4glViNIkCh2pFwy_EAMYASAAEgJy2PD_BwE&hvadid=174263817498&hvdev=c&hvlocphy=9026847&hvnetw=g&hvpos=1o1&hvqmt=b&hvrand=16524857828380178568&hvtargid=aud-664.

ShowLight: The Ultimate Lighting Solution for Your Computer by James Bull—Kickstarter [Retrieved Feb. 21, 2020) 16 pages https://www.kickstarter.com/projects/showlight/showlight-the-ultimate-lighting-solution-for-your?ref=discovery_location&term=Video%20Lights.

Smart.E Smartphone Photography & Video Light by Smart.E Smartphone Light—Kickstarter Retrieved Feb. 21, 2020) 15pages https://www.kickstarter.com/projects/2121198836/smarte-smartphone-photography-and-video-light?ref=discovery_location&term=Video%20Lights.

The Kick—a pocket sized lighting studio for photo & video by Rift Inc—Kickstarter Retrieved [Feb. 21, 2020) 12 pages https://www.kickstarter.com/projects/1918868829/the-kick-a-pocket-sized-lighting-studio-for-photo?ref=discovery_category&term=lighting.

Chatlight: Studio Quality Lighting for Video Chat by Henry Geddes & Ian Shiell—Kickstarter [Retrieved Feb. 21, 2020) 16 pages https://www.kickstarter.com/projects/chatlight/chatlight-through-light-we-connect?ref=discovery&term=Lighting%20for%20video.

Moon® UltraLight, [Retrieved Feb. 21, 2020) 16 pages https://moonultra.com.

Web Article: Amazon.com : Aputure AL-M9 Amaran LED Mini Light on Camera Video Light, Black : Camera & Photo [Retrieved Apr. 30, 2020] 9 pages https://www.amazon.com/gp/product/B01ITRLJIW/ref=as_li_qf_sp_asin_il_tl?ie=UTF8&tag=foxnomad-20&camp=1789&creative=9325&linkCode=as2&creativeASIN=B01ITRLJIW&linkId=7400ed3a2695bf5776b5962094a9be39.

Web Article: ARRI [Retrieved Apr. 30, 2020] 3 pages https://www.arri.com/en/lighting/led/skypanel.

Web Article: The Orb: Danish Designed, Intelligent Lighting, INDIEGOGO[Retrieved Apr. 30, 2020] 40 pages https://www.indiegogo.com/projects/the-orb-danish-designed-intelligent-lighting#/.

Web Article: LUM-X APP [Retrieved Apr. 30, 2020] 22 pages https://lumecube.com.

Web Article: logitech [Retrieved Apr. 30, 2020] 5 pages ttps://www.nfo.log itech.com/vc-tech-features.html#rightlig.

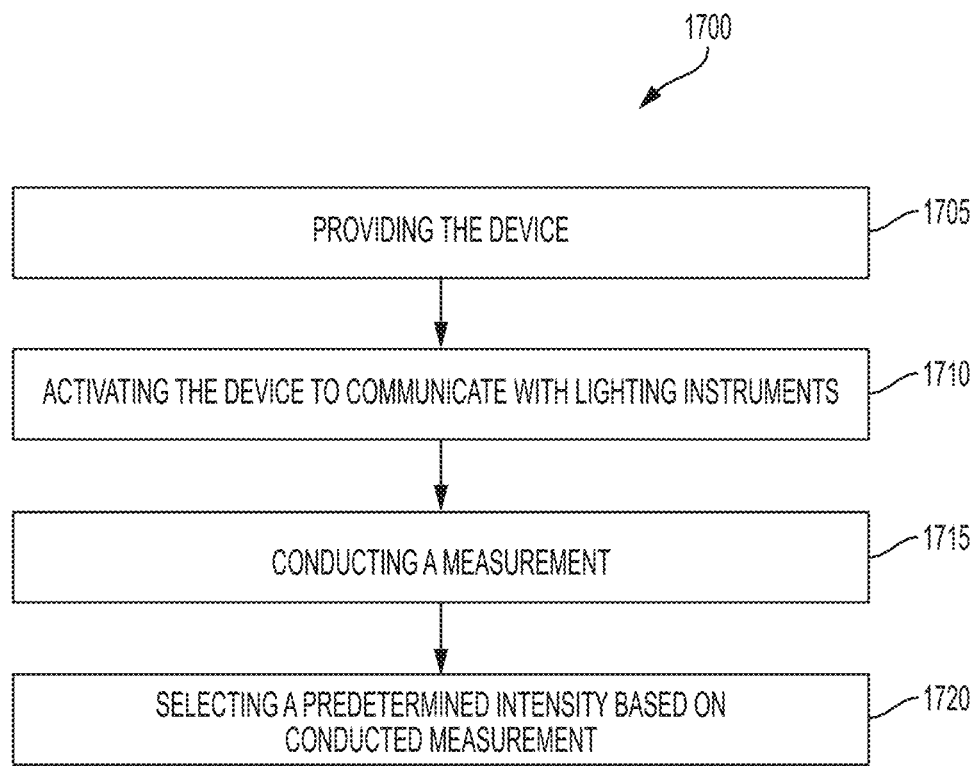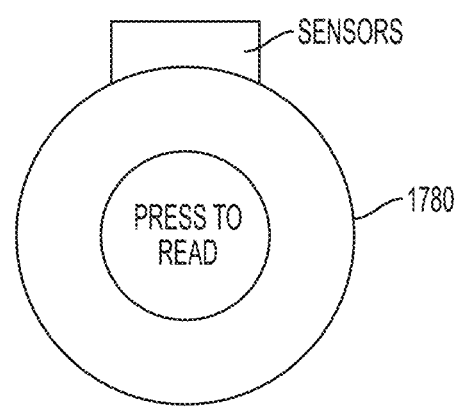
FIG. 17

LIGHTING SYSTEM AND METHOD FOR OPERATING LIGHTING SYSTEM

CROSS-REFERENCE TO RELATED APPLICATIONS

This application is a continuation of U.S. patent application Ser. No. 15/991,990, filed May 29, 2018, which claims the benefit of U.S. Provisional Application 62/512,596, filed on May 30, 2017. This application claims the benefit of priority of these prior applications and the entirety of each prior application is expressly incorporated herein by reference thereto.

FIELD OF THE INVENTION

The present invention generally relates to lighting systems and methods of operating a lighting system. More particularly, the present invention relates to a lighting system for illuminating a subject in an image or video and a method for operating such system.

BACKGROUND OF THE INVENTION

As personal computing systems such as desktop computers, laptop computers, tablet computers, smart phones, and the like become more powerful, less costly, and smaller, their use proliferates. Many of these systems for use on the Internet can include a web camera for capturing and transmitting images and/or video of the computer user over a network or the Internet. Individuals, government organizations, educational institutions and businesses are increasingly using these systems for video conferencing because they allow participants in remote locations to meet and converse with one another as if they were present in the same room. Such video conferences may involve conversations between individuals, or conferences between groups, and may include, without limit, topics such as personal activities, business matters or transactions, commerce, or academics.

In any setting, lighting is an important factor that affects images and/or video quality. If lighting is not proper, image and/or video quality suffers. Generally, the ambient light available in the space where the computer system is utilized is inadequate for video conferencing. Such deficiency and attempts to compensate such deficiency (e.g., using lights independent of the computer or web camera to shine light on the subject, such as overhead lights) may lead to a variety of problems, including improperly illuminated subject, background lighting that is too bright, undesired shadows, and other problems. These problems may cause the subject's face to appear dark on the one hand or washed out on the other, hiding or obscuring the nuances of facial expression, eye-contact, or other critical aspects of non-verbal communication and making the image and/or video less appealing. Thus, proper lighting, which helps to convey these features, is not only important for effective communication, but also necessary to professionally distinguish a user in the increasingly competitive video conferencing and virtual presence industry.

Additionally, as the computing systems are smaller and more portable, the need exists for a small portable lighting system. Such a system allows users to engage in video conferencing easily, with effective lighting, anywhere an Internet connection is available.

SUMMARY OF THE INVENTION

In accordance with principles of the invention, a lighting system for illuminating a recording area is contemplated. The system may comprise a lighting instrument maneuverable between a folded position and an expanded position and configured to fit a display in the expanded position, the lighting instrument including a first panel and a plurality of lighting sources disposed on the first panel, the first panel having a recess configured to expose a portion of the display and a camera on the display, and the plurality of lighting sources having a lighting source of first size and a lighting source of second size that is larger than the first size and the lighting source of second size is disposed farther from the recess compared to the lighting source of first size. Each of the different lighting sources can be interchangeable to accommodate the user's environment and to enhance the video/image's quality.

The system can further include a second panel connected substantially perpendicularly to the first panel and a plurality of lighting sources disposed on the second panel.

The plurality of lighting sources disposed on the second panel has a lighting source of first size and a lighting source of second size that is larger than the first size.

The lighting source of second size on the second panel can be disposed closer to the first panel compared to the lighting source of first size on the second panel.

The second panel can comprise a recess configured to expose a portion of the display.

The lighting instrument can further include a distance sensor configured to measure distance between a subject in the recording area and the distance sensor.

The light intensity of one or more of the lighting sources can be adjustable according to the measured distance.

The lighting instrument can further include an ambient light meter configured to measure ambient light in the recording area.

The light intensity of one or more of the lighting sources can be adjustable according to the measured ambient light.

The recess can comprise a curvature that curves into the first panel.

The system can further comprise additional lighting instruments with each additional lighting instrument including a lighting source, wherein the lighting source is configured to produce a light intensity weaker than the light intensity of the lighting instrument.

In accordance with principles of the invention, a method for operating a lighting system is contemplated. The lighting system comprises a plurality of lighting instruments including a first lighting instrument and one or more additional lighting instruments each having a plurality of lighting sources. The first lighting instrument is integrated into or installed on a display and each of the plurality of lighting instruments includes a distance sensor configured to measure distance between a subject and the distance sensor. The plurality of lighting instruments are in communication with a microprocessor to receive computer instructions from the microprocessor and to transmit measurements to the microprocessor. The method may comprise:

activating, by the microprocessor, the plurality of lighting instruments, wherein the plurality of lighting sources on the first lighting instrument are turned on to emit light at an intensity without considering a distance measurement from the distance sensor on the first lighting instrument and the plurality of lighting sources on the one or more additional lighting instruments emit light at an intensity according to a distance measurement from their respective distance sensor;

recalibrating, by the microprocessor, the light intensity of the plurality of lighting sources on the first lighting instrument to another light intensity based on the distance measurement from the distance sensor on the first lighting instrument; and adjusting, by the microprocessor, the light intensity of the plurality of lighting sources on the one or more additional lighting instruments based on the recalibration.

The light intensity of the lighting sources on the one or more additional lighting instruments can be adjusted inversely proportional to the recalibrating of the light intensity of the light sources on the first lighting instrument.

The light intensity of the lighting sources on the one or more additional lighting instruments can be adjusted in commensurate to the recalibrating of the light intensity of the light sources on the first lighting instrument.

The light intensity of the light sources on the first lighting instrument can be stronger than the light intensity of the lighting sources on the one or more additional lighting instruments before the recalibrating step.

The light intensity of the light sources on the first lighting instrument can be stronger than the light intensity of the lighting sources on the one or more additional lighting instruments after the adjusting step.

The method can further comprise providing, by the microprocessor, a plurality of predetermined light intensities.

One of the predetermined light intensities can be selected to change the light intensity of each lighting instrument after the activation step.

The method can further comprise changing, by the microprocessor, color temperature of the plurality of lighting instruments to match ambient color in image or video image captured by the camera.

Each lighting instrument can further include an ambient light meter configured to measure an amount of ambient light in a recording area and the adjusting step further adjusts the light intensity of the plurality of lighting sources on the one or more additional lighting instruments based on the measured amount of ambient light.

In the activating step, the light sources on the one or more additional lighting instruments can emit a light intensity according to the distance measurement from their respective distance sensor and the ambient light measurement from their respect ambient light meter.

The microprocessor is electrically coupled to a non-transitory memory that is configured to store computer executable instructions. Each of the steps in the aforementioned method is stored as computer executable instructions in the memory. The instructions are executable by the microprocessor to perform the above steps.

In accordance with principles of the invention, a method for selecting a predetermined light intensity for a plurality of lighting instruments is contemplated. The plurality of lighting instruments includes a first lighting instrument installed on a display having a web camera and additional lighting instruments. Each of the lighting instruments is in communication with a microprocessor to receive and transmit computer instructions. The microprocessor is electrically coupled to an non-transitory memory configured to store data comprising a plurality of predetermined light intensities and a plurality of luminance ranges for different focus areas. The data is accessible by the microprocessor. The method may comprise:

capturing a frame, by the camera, of a recording area;

constructing, by the microprocessor, a brightness representation of the frame;

determining, by the microprocessor, a focus area in the frame that is assigned with one of the plurality of luminance ranges;

determining, by the microprocessor, a location in the brightness representation that corresponds to the focus area;

determining, by the microprocessor, luminance of the determined location and comparing the determined luminance with the assigned luminance range;

determining, by the microprocessor, that the determined luminance is outside the assigned luminance range;

selecting, by the microprocessor, a predetermined light intensity from the plurality of predetermined light intensities that changes luminance of the region in the recording area corresponding to the determined location to be within the assigned luminance range; and adjusting, by the microprocessor, light intensity of one or more of the plurality of lighting instruments based on the selected predetermined light intensity.

The step of constructing a brightness representation may include creating a grid with lines representing light absorbing surfaces or light reflective surfaces and spaces between the lines representing transparent surfaces.

The step of determining a location in the brightness representation that corresponds to the focus area may include determining a plurality of spaces corresponding to the focus area.

The step of determining luminance and comparing the determined luminance with the assigned luminance range may include calculating an average luminance of the spaces and comparing the average luminance with the assigned luminance range.

The brightness representation may be constructed by directing light in the recording area to the camera in a manner such that the directed light is recognized by the camera in the form of a grid.

The microprocessor is electrically coupled to a non-transitory memory that is configured to store computer executable instructions. Each of the steps in the aforementioned method is stored as computer executable instructions in the memory. The instructions are executable by the microprocessor to perform the above steps.

Counterpart computer-readable medium embodiments are understood from the above and the overall disclosure.

In accordance with principles of the invention, a lighting system for illuminating a recording area is contemplated. The system comprises a plurality of lighting instruments that include a first lighting instrument and one or more additional lighting instruments. Each lighting instrument includes a plurality of light sources and a distance sensor configured to measure distance between the recording area and the distance sensor. The system also comprises a microprocessor in communication with the plurality of lighting instruments.

The microprocessor is configured to activate the plurality of lighting instruments. In this step, the plurality of light sources on the first lighting instrument are turned on to emit light at an intensity on the recording area without considering a distance measurement from the distance sensor on the first lighting instrument. The plurality of light sources on the one or more additional lighting instruments are turned on to emit light at an intensity on the recording area according to a distance measurement from their respective distance sensor to the recording area. The microprocessor is also configured to receive a distance measurement from the distance sensor on the first lighting instrument to a subject in the recording area. The microprocessor is also configured to recalibrate the light intensity produced by the plurality of light sources on the first lighting instrument to another light intensity based on the distance measurement from the distance sensor on the first lighting instrument to the subject in the recording area. The microprocessor is further configured to adjust the light intensity produced by the plurality of light sources on the one or more additional lighting instruments based on the recalibration.

In one embodiment, the microprocessor is further configured to adjust the light intensity produced by the light sources on the one or more additional lighting instruments inversely proportional to the recalibrating of the light intensity produced by the light sources on the first lighting instrument.

In one embodiment, the microprocessor is further configured to adjust the light intensity produced by the light sources on the one or more additional lighting instruments in commensurate to the recalibrating of the light intensity produced by the light sources on the first lighting instrument.

In one embodiment, the microprocessor is further configured to increase the light intensity produced by the light sources on the first lighting instrument to a level that is stronger than the light intensity produced by the light sources on the one or more additional lighting instruments before the microprocessor performs the recalibrating step.

In one embodiment, the microprocessor is further configured to increase the light intensity produced by the light sources on the first lighting instrument to a level that is stronger than the light intensity produced by the light sources on the one or more additional lighting instruments after the microprocessor performs the adjusting step.

In one embodiment, the microprocessor is further configured to select a predetermined light intensity from a plurality of predetermined light intensities to change the light intensity produced by each lighting instrument.

In one embodiment, the microprocessor is further configured to adjust color temperature of the light sources on the plurality of lighting instruments.

In accordance with principles of the invention, a method for operating a lighting system is contemplated. The method comprises communicating, by a microprocessor, with a plurality of lighting instruments that include a first lighting instrument and one or more additional lighting instruments. Each lighting instrument includes a plurality of light sources and a distance sensor configured to measure distance between a recording area and the distance sensor. The method also comprises activating, by the microprocessor, the plurality of lighting instruments. In this step, the plurality of light sources on the first lighting instrument are turned on to emit light at an intensity on the recording area without considering a distance measurement from the distance sensor on the first lighting instrument. The plurality of light sources on the one or more additional lighting instruments are turned on to emit light at an intensity on the recording area according to a distance measurement from their respective distance sensor to the recording area. The method also comprises, receiving, by the microprocessor, a distance measurement from the distance sensor on the first lighting instrument to a subject in the recording area. The method further comprises recalibrating, by the microprocessor, the light intensity of the plurality of light sources on the first lighting instrument to another light intensity based on the distance measurement from the distance sensor on the first lighting instrument to the subject in the recording area. The method further comprises adjusting, by the microprocessor, the light intensity produced by the plurality of light sources on the one or more additional lighting instruments based on the recalibration.

In one embodiment, the adjusting step adjusts the light intensity produced by the light sources on the one or more additional lighting instruments inversely proportional to the recalibrating of the light intensity produced by the light sources on the first lighting instrument.

In one embodiment, the adjusting step adjusts the light intensity produced by the light sources on the one or more additional lighting instruments in commensurate to the recalibrating of the light intensity produced by the light sources on the first lighting instrument.

In one embodiment, the method further comprises increasing the light intensity produced by the light sources on the first lighting instrument to a level that is stronger than the light intensity produced by the light sources on the one or more additional lighting instruments before the recalibrating step.

In one embodiment, the method further comprises increasing the light intensity produced by the light sources on the first lighting instrument to a level that is stronger than the light intensity produced by the light sources on the one or more additional lighting instruments after the adjusting step.

In one embodiment, the method further comprises selecting a predetermined light intensity from a plurality of predetermined light intensities to change the light intensity produced by each lighting instrument.

In one embodiment, the method further comprises adjusting color temperature of the light sources on the plurality of lighting instruments.

In accordance with principles of the invention, a non-transitory computer readable medium embodiment is contemplated. The medium stores computer executable instructions that are executable by a microprocessor. When the instructions are executed by the microprocessor, the instructions cause the microprocessor to perform a method for operating a lighting system. The method comprises communicating with a plurality of lighting instruments including a first lighting instrument and one or more additional lighting instruments. Each lighting instrument includes a plurality of light sources and a distance sensor configured to measure distance between a recording area and the distance sensor. The method also comprises activating the plurality of lighting instruments. In this step, the plurality of light sources on the first lighting instrument are turned on to emit light at an intensity on the recording area without considering a distance measurement from the distance sensor on the first lighting instrument. The plurality of light sources on the one or more additional lighting instruments are turned on to emit light at an intensity on the recording area according to a distance measurement from their respective distance sensor to the recording area. The method also comprises receiving a distance measurement from the distance sensor on the first lighting instrument to a subject in the recording area. The method further comprises recalibrating the light intensity produced by the plurality of light sources on the first lighting instrument to another light intensity based on the distance measurement from the distance sensor on the first lighting instrument to the subject in the recording area. The method further comprises adjusting the light intensity produced by the plurality of light sources on the one or more additional lighting instruments based on the recalibration.

In one embodiment, the medium further comprises computer executable instructions that cause the microprocessor to perform a method for operating a lighting system comprising adjusting the light intensity produced by the light sources on the one or more additional lighting instruments inversely proportional to the recalibrating of the light intensity produced by the light sources on the first lighting instrument.

In one embodiment, the medium further comprises computer executable instructions that cause the microprocessor to perform a method for operating a lighting system comprising adjusting the light intensity produced by the light sources on the one or more additional lighting instruments in commensurate to the recalibrating of the light intensity produced by the light sources on the first lighting instrument.

In one embodiment, the medium further comprises computer executable instructions that cause the microprocessor to perform a method for operating a lighting system comprising increasing the light intensity produced by the light sources on the first lighting instrument to a level that is stronger than the light intensity produced by the light sources on the one or more additional lighting instruments before performs the recalibrating step.

In one embodiment, the medium further comprises computer executable instructions that cause the microprocessor to perform a method for operating a lighting system comprising increasing the light intensity produced by the light sources on the first lighting instrument to a level that is stronger than the light intensity produced by the light sources on the one or more additional lighting instruments after performing the adjusting step.

In one embodiment, the medium further comprises computer executable instructions that cause the microprocessor to perform a method for operating a lighting system comprising selecting a predetermined light intensity from a plurality of predetermined light intensities to change the light intensity produced by each lighting instrument.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 17 an illustrative method of selecting a predetermined intensity based on measurements from a fob in accordance with some embodiments of the present invention.

Figure 1B:
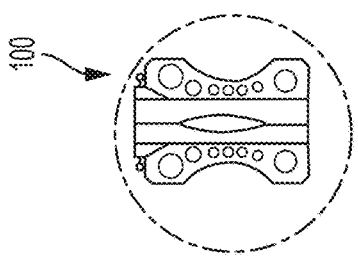
FIGS. 1a-1b depict an illustrative first lighting instrument in accordance with some embodiments of the present invention.

The components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE INVENTION

Embodiments of the present invention relate to a lighting system for illuminating a subject and a method of operating a lighting system for illuminating a subject. The system and method may be utilized with a computer web camera or for video conferencing. The system and method may also be utilized with other cameras or for other image or video recording when studio quality lighting is desired. When leveraging a computer web camera or video conferencing, the lighting will be controlled by software at the OS level or an application installed on the computer or mobile device.

The lighting system is a system that improves image or video quality. The system makes preferably studio quality light available to any recording or streaming activity through the web camera, including, for example, video conferencing, web conferencing, webinars, and webcasts. Because the system is portable and easily deployable, the system can be carried to and quickly set up by the user in any location where the computer is or where the recording will occur. While there are existing systems that can improve image or video quality by adjusting the light emitted onto the user, the resulting light is not studio quality or does not meet the quality expected from recording in a lighting studio. The system includes a lighting instrument that can be installed on the display with the camera exposed. The lighting instrument includes a light source configuration that can reduce lens flare. The system can emit light at a certain intensity and angle, and the system can be operated by a method that includes procedures that help the user find the optimal light intensity, angle, or both for the recording area. The procedure may consider the distance between the subject in the recording area and the lighting instrument, the amount of ambient light in the recording area, the location of the subject in the recording area, or any combination thereof. The procedure allows for the adjustment of the angel through the robotic panning and tilting of the additional lighting instruments. The method also allows the user to further adjust the intensity and angle determined by the procedures if necessary. The method saves time and efforts needed to configure the light produced by the system. The system and method can be set up and operated by any user without depending on the skills of a lighting professional. The present invention includes a software module having a plurality of pre-defined settings that may take into account the user's environment to make the setup for the user easier. The software module can be installed on a computer or a mobile device or be implemented on a central hub that is separate from the computer or mobile device. The central hub can communicate with the computer or mobile device to adjust light intensities of the lighting instruments based on distance or ambient lighting. The central hub is described in later sections of the disclosure. The distance can be measured based on the distance between one or more of the lighting instruments and the subject, between the central hub and the subject, or a combination thereof. The ambient lighting can be measured by one or more of the lighting instruments, the computer or mobile device, the central hub, or a combination thereof.

The lighting system may comprise of one or more lighting instruments. Each of the lighting instruments may include one or more light sources that can emit light. The light sources may be light-emitting diodes (LEDs), incandescent light bulbs, quartz-halogen lamps, fluorescent tubes, other sources that have similar performance and characteristics, or a combination thereof that can preferably emit studio quality light. Preferably, the light sources are LEDs or other sources having performance and characteristics similar to LEDs (e.g., sources that consume about the same amount of power and that generate about the same amount of heat). The lighting instruments are maneuverable between a folded position and an expanded position. The lighting instruments are set up in the expanded position to illuminate the subject. When the lighting instruments are in the folded position, they may be stored in a portable kit that can be carried to a location where the lighting system is needed. The lighting instruments can also, when not deployed or packed for travel, be connected to a three-pronged docking module that can function as a desk lamp to improve video or image quality from a single position such as the user's desk. Each lighting kit provided can be connected to a central hub to be controlled by the user from the computer or mobile device.

Figure 1A:
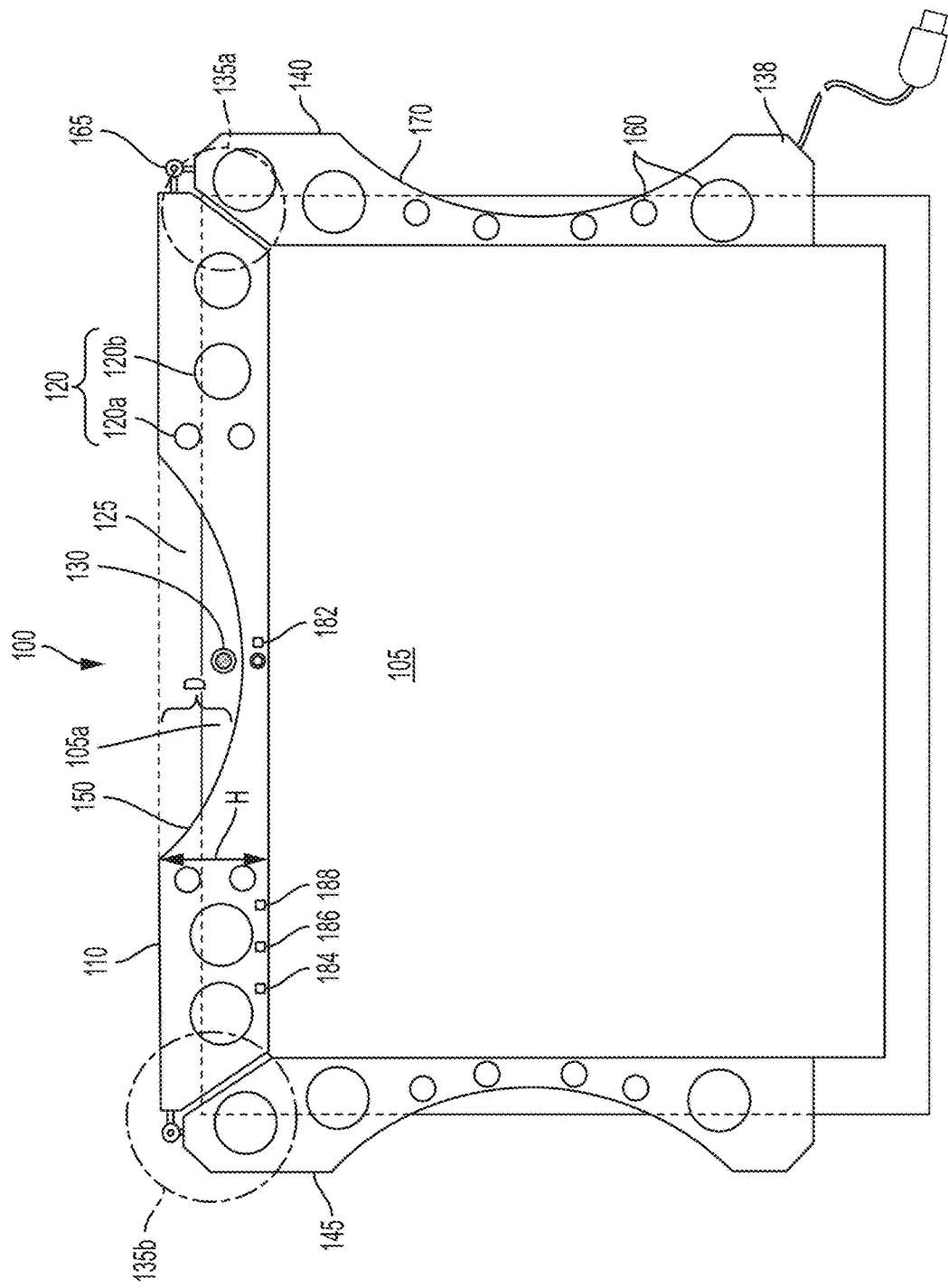

The lighting system may comprise a first lighting instrument 100 as depicted in FIG. 1a. In particular, FIG. 1a illustrates the first lighting instrument 100 in its expanded configuration or when the first lighting instrument 100 is installed on a display. The first lighting instrument 100 may be configured to fit on the display 105 in this position. The first lighting instrument 100 may comprise one or more panels, and preferably, three panels that are connected to form an inverted "U" shaped configuration. The first lighting instrument 100 may include a first panel 110 and a plurality of light sources 120 disposed on the first panel 110. The first panel 110 may be configured to fit from the top of the display 105. The first panel 110 may have a recess 125 configured to expose a portion 105a of the display 105 and a camera 130 (or a lens of a camera) on the display 105. In some embodiments, the first panel 110 may have an opening configured to expose only the camera 130 and the edge of the display 105 may not need to be exposed. In some embodiments, the first panel 110 may have a structure configured without blocking the view of the camera 130 and the structure may not have a recess or opening for exposing the edge of the display 105. The camera 130 may be a camera built into the display 105 or a camera separately attached to the display 105. The first panel 110 may have a first end 135a for connecting to a second panel 140 and a second end 135b opposite to the first end 135a for connecting to a third panel 145.

The light sources 120 may have a light source of first size 120a and a light source of second size 120b that is larger than the first size. Preferably, the light source of second size 120b is disposed at a location that is farther from the recess 125 compared to the light source of first size 120a. The light sources 120 may be disposed at a location between the recess 125 and the first end 135a. Preferably, in that between location, the light sources 120 are disposed at a location that is farther from the center of the recess 125 or that is closer to the first end 135a. In some embodiments, however, only the light sources of second size 120b may need to be disposed at a location that is farther from the center of the recess 125 or that is closer to the first end 135a. In this location, the light sources 120 or the light sources of second size 120b are also farther from the camera or closer to a corner of the display 105 when the first lighting instrument 100 is installed on the display 105. The locations of the light sources 120 and 120b discussed above also apply to the corresponding light sources on the other side of the first panel 110 (the side near the second end 135b). Additional light sources may be employed if necessary as long as the light sources 120 or 120b are also disposed at the above indicated locations. In some embodiments, the location of the light sources 120 or the light sources of second size 120b with the respect to the recess 125, the center of the recess 125, or the first end 135a may be irrelevant if the first lighting instrument 110 is configured to have the light sources 120 or the light sources of second size 120b disposed at a location far enough from the camera 130.

The recess 125 may have any shape, form, or structure configured to expose a portion 105a of the display 105 and the camera 130. In one embodiment, the recess 125 may comprise a curvature 150 that takes the form of a curved indentation or notch that curves into the first panel 110 or toward the display 105. The first panel 110 may have a height H, and the recess 125 or the curvature 150 preferably has a depth D that is more than half of that height (referring to measurements conducted in the same direction, e.g., in the vertical direction). When the first lighting instrument 100 is installed on the display 105, a portion 105a of the display 105 and the camera 130 are in the recess 125 and extend above the curvature 150. The recess 125 may be formed in the center of the first panel 110 or a location on the first panel 125 that corresponds to the location of the camera 130. Preferably, there are no light sources disposed under the curvature 150 or the recess 125.

The first lighting instrument 100 may include a second panel 140 and a plurality of light sources 160 disposed on the second panel 140. The second panel 140 may be connected to the first panel 110 through the first end 135a via a first joint, and preferably a detachable and/or moveable joint such as a hinge 165. The joint may comprise a bracket, bolt, screw, nail, nut, rivet, washer, anchor, other fastener, or a combination thereof and may preferably be configured to allow the second panel 140 and the first panel 110 to attach/detach and turn, swing, rotate, or move with respect to each other. Hinge 165 may be further configured in a manner such that the first lighting instrument 100 is maneuverable between the folded position and the expanded position. The light source sources 160 may also include a light source of first size and a light source of second size that is larger than the first size. The light source of second size is preferably disposed closer to the first panel 110 compared to the light source of first size. The second panel 140 may also include a recess 170 configured to expose a portion of the display 105. The recess 170 on the second panel 140 and the recess 150 on the first panel may have the same or different shape, form, or structure. The second panel 140 may be configured to fit to a side of the display 105 that is substantially perpendicular to the top side on which first panel 110 is attached, such that the second panel 140 and first panel 110 may form an "L" shaped configuration, for example. As such, the second panel 140 may be substantially perpendicular to the first panel 110 when the first lighting instrument 100 is installed on the display 105. When the second panel 140 is fitted to the display 105, a portion of the display 105 extends above the recess 170. The light sources 160 may comprise a light source of first size and a light source of second size that is larger than the first size. The light source of first size may be disposed under the recess 170. The first end 135*a* may also be the first end of the second panel 140, and additional light source of second size may be disposed on a second end 138 of the second panel 140 that is opposite to the first end 135*a*. The recess 170 may be between the light source of second size on the first end 135*a* and the light source of second size on the second end 138.

The first lighting instrument 100 may include a third panel 145 that may be the same as or similar to the second panel 140. Thus, the discussion above with respect to the second panel also applies the third panel 145. The third panel may be connected to the first panel 110 through the second end 135*b* via a second joint. The third panel 145 may be configured to fit another side of the display 105 that is substantially perpendicular to the top side on which the first panel 110 is attached, such that the third panel 145 and the first panel 110 may form an "L" shaped configuration, for example. The other side of the display 105 is also a side opposite to the side on which the second panel 140 is installed. As such, the third panel 145 may be substantially perpendicular to the first panel 110 and be parallel to the second panel 140 when the first instrument 100 is installed on the display 105. The recess on the third panel 145 and the recess 170 on the second panel 140 may have the same or different shape, form, or structure.

When first panel 110, the second panel 140, and the third panel 145 are connected together or installed on the display 105 as discussed above, the light sources of second size on all three panels are located near the first end 135*a* and the second end 135*b* or the corners of the display 105 that correspond to the ends 135*a*, 135*b*.

In some embodiments, each panel of the first lighting instrument may comprise only light sources of the same size. In that situation, the location of the light source of second size discussed with respect to the first panel controls the location of those light sources on the first panel. The same size light sources on each panel may have the same or different size compared to the same size light sources on another panel. For example, all the light sources on the second panel may have size A and all the light sources on the third panel have size B, and size A and size B may be the same or different. The light source of first size/second size on one panel may also be the same as or different from the light source of first size/second size on another panel. The recess on each panel may also have the same or different shape, form, or structure. The first lighting instrument may also comprise only one or more of the aforementioned panels with no other panels attached to the display. For example, the first lighting instrument may comprise of only the first panel or only the first panel and the second panel with no other panels covering the remaining sides of the display. The first lighting instrument may also comprise of only one or more of the aforementioned panels and other different panels covering the remaining sides of the display. For example, the first lighting instrument may comprise of only the first panel or only the first panel and the second panel and panels having no curvatures or light sources covering the remaining sides of the display. The dimensions of each panel may also be the same or different. The lighting system is configured in a universal fashion that gives the user the option of deploying their own lighting instruments.

The light sources may have a circular, elliptical, square, rectangular, or other shape. In some embodiments, each panel of the first lighting instrument may comprise a lighting strip spanning the size of each panel and the lighting strip may include a narrower section to form the recess.

Although FIG. 1*a* depicts a first lighting instrument that is configured to fit a 15-inch display, the first lighting instrument may also be configured to fit display of other size as well. The first lighting instrument may be built to fit only displays of a certain size (e.g., only 17-inch displays) or displays of different sizes (e.g., 17, 24, and 32-inch displays) by incorporating any necessary mechanisms that can extend or shorten the length of each panel. The first lighting instrument may also be configured to fit the display of a mobile device. FIG. 1*b* depicts the first lighting instrument 100 in the folded position.

The first lighting instrument 100 may further comprise a distance senor 182 and/or an ambient light meter 184. The distance sensor and the ambient light meter may be built into the first lighting instrument 100 or be externally connected to the first lighting instrument 100 by wired or wireless connection. The distance sensor may be configured to measure a distance between a subject that the first lighting instrument is illuminating (or a subject in the view of the camera) and the distance sensor. Preferably, the distance sensor is configured to measure the distance between the subject (closest to the distance sensor) and the distance sensor. Also preferably, the distance sensor is built in a location in the first lighting instrument 100 that is close to the camera 130 (or closer to the camera 130 compared to other sensors 184, 186, and 188) when the first lighting instrument 100 is installed on the display 105. The ambient light meter may be configured to measure an amount of ambient light in the location where the subject is or where the lighting system is setup. The distance sensor and the ambient light meter may be in electrical communication with the first lighting instrument 100, and the light intensity of one or more light sources on the first lighting instrument may be adjusted according to the measurement of the distance sensor and/or the ambient light meter. The distance sensor and/or the ambient light meter may directly control the light intensity of one or more light sources. The interaction between the sensor/meter and the light sources may also be controlled by a microprocessor implemented with the module described below. The resulting light intensity may be of similar quality that one would expect from recording an image or video in a lighting studio or that the subject should receive if the subject were placed in a lighting studio for recording an image or video. In particular, the resulting intensity may correspond to the intensity produced by the front light of a three-point lighting kit used in the lighting studio. This is also known as studio quality intensity. The resulting intensity may be the best intensity or one of several suitable intensities for the subject's location determined by the module. In some embodiments, intensity adjustment may not be necessary if the default intensity (e.g., the initial intensity when the light sources are turned on before any adjustment) is the best or a suitable intensity for the subject's location after the module makes the determination.

The light angle or direction of the one or more light sources on the first lighting instrument 100 may also be adjusted according to the measurement of the distance sensor and/or the ambient light meter. The light direction may be adjusted by tilting, rotating, pivoting, or swiveling the light sources or by any other movement. The light sources of the first lighting instrument may be equipped with the necessary mechanisms to achieve these movements and the mechanisms may be controlled by the module or adjusted by the user. In some embodiments, the light sources do not need to be physically moved in order to change the light direction. The light direction can be changed by varying the voltage or current supplied to the light source, by applying a mirror or collimator over the light source to direct the light to a certain angle, or by any other method. The light sources can be individually or collectively controlled to change their light direction. The first lighting instrument 100 may further include a height sensor 186 that is configured to measure the subject's height with respect to the height sensor (e.g., the top of the subject is 3 inches below the height sensor) and/or a location sensor 188 that is configured to determine the subject's latitude and longitude (and/or other coordinates). A separate sensor may be installed on the subject to record its coordinates and to transmit the recorded coordinates to the location sensor 188. The location sensor 188 may be a device that is configured to communicate with that separate sensor, Satellite, or other similar system so that it can receive those coordinate information. These sensors may include their own cameras to help conduct such measurements or use the camera 130 of the display 150 help conduct such measurements. For example, when the location sensor detects that the subject is off-center in the view of the location sensor or the camera, the light direction can be adjusted by tilting the light sources to point light toward the correct location. The resulting direction is the direction that one would expect from recording an image or video in a lighting studio or that the subject should receive the light from if the subject were placed in a lighting studio for recording an image or video. The resulting direction may correspond to the light direction coming from the front light of a three-point lighting kit used in the lighting studio. This is also known as studio quality direction. The resulting direction may be the best direction or one of several suitable directions for the subject's location determined by the module. In some embodiments, direction adjustment may not be necessary if the default direction (e.g., the initial direction when the light sources are turned on before any adjustment) is the best or a suitable direction for the subject's location after the module makes the determination.

The sensors and meters may also be built into the second and third lighting instrument. The sensors and meters may be equipped in one or more of the lighting instruments. In some embodiments, the sensors and meters are separate devices that are not embedded in the lighting instrument. When the sensors and meters are separate devices, the user may use sensors and meters manufactured by a third party in conjunction with the lighting system and the software module (described below). In some embodiments, the lighting system and the software module may operate without any sensor or meter.

Light with studio quality intensity, studio quality direction, or both studio quality intensity and studio quality direction may be known as studio quality light. Studio quality light can establish a primary focus and a secondary focus. Primary focus is the area that is the most prominent in the view of the camera or an area that is more prominent than other areas. Primary focus may be an area that receives a higher intensity from the first lighting instrument compared to other lighting instruments or an area that receives the highest intensity from all the lighting instruments. Primary focus may also be an area that receives a weaker intensity from the first lighting instrument compared to other lighting instruments but the overall intensity from all the lighting instruments at that area is the highest. The primary focus may also be an area that the viewer first sees in the recorded image or video. Other areas that the viewer sees subsequently may be the secondary focus. Studio quality light has the characteristic of clearly separating the primary focus from the secondary focus and reducing unwanted shadows on the subject or the background. In the instance of a person being the subject, studio quality lighting ensures the subject's face and eyes are lit in a quality and intensity of light that attracts focus to the subject first and distinguishes the subject as a visual priority within the video image.

Studio quality light may also include light with controlled intensity, angle, or both coming from at least two lighting instruments from two different angles that are operated to complement each other (e.g., the intensity of one lighting instrument is dependent on the intensity of another lighting instrument).

Studio quality light is light that cannot be obtained solely based on ambient light. Ambient light refers to light that is already present in a scene and is not supplied by the lighting instruments. Ambient light can be natural light, either outdoors or coming through windows, for example. It can also be artificial light such as light used to light a room, including overhead lights with intensity that can be adjusted through a sliding switch or similar mechanism without regard to the location of the subject in the room or the distance between the subject and the light.

Studio quality light may also refer to the native light emitted by a light source that renders the color of the subject appearing in the image or video to more accurately reflect or to be closer to the true color in reality (e.g., skin tones are shown more accurately). A light source that can emit such quality of light may be a LED that is manufactured to operate at about 6300 Kelvin. This type of LED is different from the regular LEDs in that studio quality LEDs possess individual diodes all with the same color and maintain a more consistent color temperature whereas the regular LEDs can possess diodes of varying color temperature and are more likely to drift in color temperature (e.g., studio quality LEDs operate around 6300 Kelvin or would not drift above 8000 Kelvin or below 5000 Kelvin) when they are connected to and operated by the same system. Studio quality light may also refer to light with any combination of the aforementioned characteristics.

Figure 2:
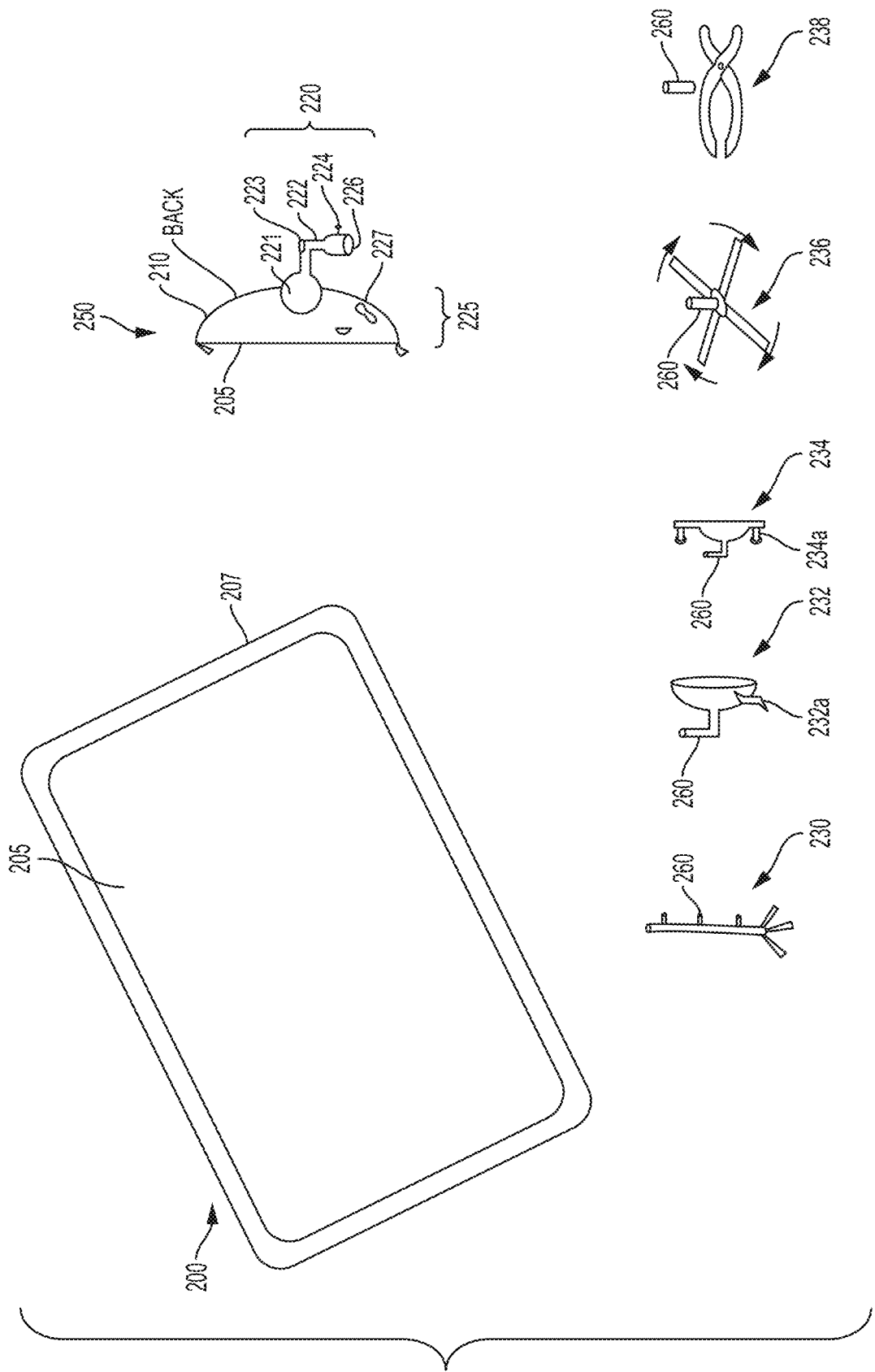
FIG. 2 depicts an illustrative second lighting instrument and illustrative light mounts in accordance with some embodiments of the present invention.

The lighting system may also comprise of a second lighting instrument. The second light instrument may comprise of one or more light sources. FIG. 2 depicts an illustrative second lighting instrument 200 and illustrative light mounts in accordance with some embodiments of the present invention. The second lighting instrument 200 may include a front light panel 225 with a preferably front 205 frosted, a touch panel power, an intensity control, an enclosure 210, and a light source. The light source may be arranged between the front 205 and the enclosure 210 and be configured to emit light from the front 205. The front 205 is preferably rectangular and may have a dimension of 5.5 inch by 3.5 inch. The front 205 may have other shapes and dimensions. The touch panel power and the intensity control are switch mechanism (e.g., button, knob, or slider) that can be activated (e.g., depressed, turned, or touched) by the user to turn on and adjust the light intensity of the second lighting instrument 200, respectively. The second lighting instrument 200 may also include an angle control and other additional control. The edge 207 of the panel 225 may be made of rubber or other materials. The edge 207 may be further structured to protrude above the front 205. The combination of the front 205, the enclosure 210, and the light source in between is referred to as the panel 225. 250 depicts a side view of the second lighting instrument 200. The second lighting instrument 200 may also include a connecting mechanism 220 configured to attach the second lighting instrument 200 to a light mount. The connecting mechanism 220 may include a swivel ball 221 and an extension 222 including one or more lock off swing nobs 223, 224 and an opening 226 to receive a male connector of the light mount. The extension 222 is configured to tighten and loosen the connection between the extension 222 and the male connector of the light mount. The front panel 225 can swivel or rotate in any direction with respect to the connecting mechanism 220. The front panel 225 may have a depth or thickness of 1 inch. The front panel 225 may include a female A/C power connector 227 or other connector for receiving power to turn on the light source. In some embodiments, the extension 222 may have an embedded electrical connection if the male connector of the light mount is configured to provide electricity so that the connector 227 is unnecessary. In some embodiments, the connector 227 is built in the opening 226. The light mount may be a retractable antennae stand 230, a suction cup wall mount 232 including a release lever 232a, a permanent wall mount 234 with screws 234a, a ceiling tile "scissor" clip 236, a general clamp 238, or a docking mechanism (FIG. 9) that can be secured to an installation surface. Each of these mounts include a male connector 260 configured to be inserted into the opening 226.

The light mount can used with any of the three lighting instruments or lighting instruments manufactured by a third party.

The second lighting instrument may be set up anywhere in relation to the subject or the first lighting instrument to provide additional light. Preferably, the second lighting instrument is set up at a location to illuminate the background and the back of the subject (e.g., area between the subject and the background), to reduce the shadow of the subject in the background by counteracting either the first light source or other ambient light, and to reduce shadows on the subject. For example, the second lighting instrument may be set up off to one side (e.g., left or right side of the subject) and point to the subject. For another example, the second lighting instrument may be set up behind the individual and point partially at the back of the individual and partially on the background. The second lighting instrument may also be pointed at the background exclusively to help illuminate the subject's environment. The role of the second lighting instrument is to separate the subject from the background and to provide more light that can enhance the focus on the subject, control shadows and raise the overall light levels in the subject's environment.

Figure 3:
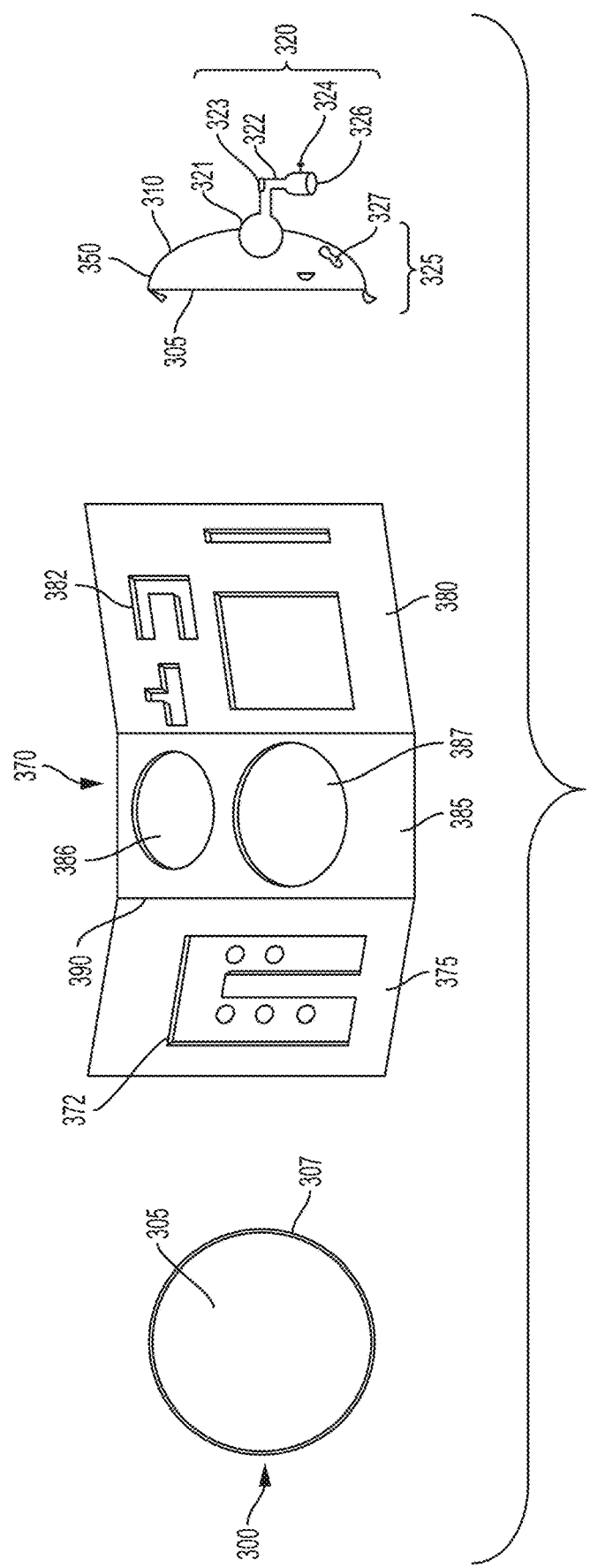
FIG. 3 depicts an illustrative third lighting instrument and an illustrative kit in accordance with some embodiments of the present invention.

The lighting system may further comprise a third lighting instrument. The third light instrument may comprise one or more light sources. FIG. 3 depicts an illustrative third lighting instrument 300 in accordance with some embodiments of the present invention. The third lighting instrument 300 may include a front light panel 325 with a front 305, a touch panel power, an intensity control, an enclosure 310, and a light source. The light source may be arranged between the front 305 and the enclosure 310 and be configured to emit light from the front 305. The front 305 is preferably circular and may have a diameter of 2.5 inches. The front 305 may have other shapes and dimensions. The touch panel power and the intensity control are switch mechanism (e.g., button, knob, or slider) that can be activated (e.g., depressed, turned, or touched) by the user to turn on and adjust the light intensity of the third lighting instrument 300, respectively. The third lighting instrument 300 may also include an angle control and other additional control. The edge 307 of the panel 325 may be made of rubber or other materials and be structured to protrude above the front 305. The combination of the front 305, the enclosure 310, and the light source in between is referred to as the panel 325. 350 depicts a side view of the third lighting instrument 350. The third lighting instrument 300 may also include a connecting mechanism 320 configured to attach the front light panel 325 to a light mount (preferably different from the light mount to which the second lighting instrument 200 is attached). The connecting mechanism 320 may include a swivel ball 321 and an extension 322 including one or more lock off swing nobs 323, 324 and an opening 326 to receive a male connector of the light mount. The extension 322 is configured to tighten and loosen the connection between the extension 322 and the male connector of the light mount. The front panel 325 can swivel or rotate in any direction with respect to the connecting mechanism 320. The front panel 325 may include a female A/C power connector 327 or other connector for receiving power to turn on the light source. In some embodiments, the extension 322 may have an embedded electrical connection if the male connector of the light mount is configured to provide electricity so that the connector 327 is unnecessary. In some embodiments, the connector 327 is built in the opening 326.

The third lighting instrument may be set up anywhere in relation to the subject or the first lighting instrument to provide additional light. Preferably, the third lighting instrument is set up at a location to accent a specific area of the subject (e.g., a person's head and shoulder) and to create further separation between the subject and the background. For example, the third lighting instrument may be set up behind the individual and point at the back of the individual's head and shoulders. In some situations, the third lighting instrument may be set up to illuminate another area different from the subject that the user wants to emphasize such as a corporate logo.

FIG. 3 also depicts an illustrative portable kit 370 for storing the lighting instruments and the light mounts in accordance with some embodiments of the present invention. The kit 370 may be a foldable case including a top section 375, a bottom section 380, and a middle section 385. The top section 375 may include a compartment 372 for storing the retracted first lighting instrument. The bottom section 380 may include multiple compartments 382 for storing multiple light mounts. The middle section 385 may include a compartment 386 for storing the second lighting instrument and a compartment 387 for storing the third lighting instrument. The kit 370 may further contain other items such as power cables, filters and diffusors. The top section 375 and the bottom section 380 are foldable along a divider 390 that separates each section. In the folded position, the top section 375 may be above the bottom section 380 or vice versa. When the kit 370 is open, it may have a dimension of 7.5 inch by 15 inch. When the kit 370 is folded, it may have a dimension of 7.5 inch by 7.5 inch. The kit 370 may have other dimensions in open or folded configuration. The kit 370 is portable in the sense that the kit 370 has a size and weight similar to a typical laptop computer or tablet computer case (e.g., between 6-17 inches). In some embodiments, the kit 370 may be smaller than the typical laptop computer or tablet computer cases and can be fitted into a laptop computer or tablet computer case so the kit 370 may be brought along with the laptop or tablet computer. The kit 370 is also portable in the same sense that the kit 370 containing the lighting instruments and the light mounts has a size and weight similar to a typical laptop computer or tablet computer case containing the laptop or tablet computer. The kit 370, with or without the lighting instruments and the light mounts, is more easily portable than a softbox or carry bag used by light studios to carry their lighting instruments and other tools. Although those instruments and tools can be transported by a carry bag, those instruments and tools or the carry bag with those instruments and tools are much bigger and heavier compared to the lighting instruments, the light mounts, the kit, and the kit containing the lighting instruments and the light mounts described in the present invention. A typical carry bag has a length of at least 30 inches and a weight of at least 20 pounds (with the lighting instruments and other tools). It also cannot be fitted into a typical laptop case.

Figure 4:
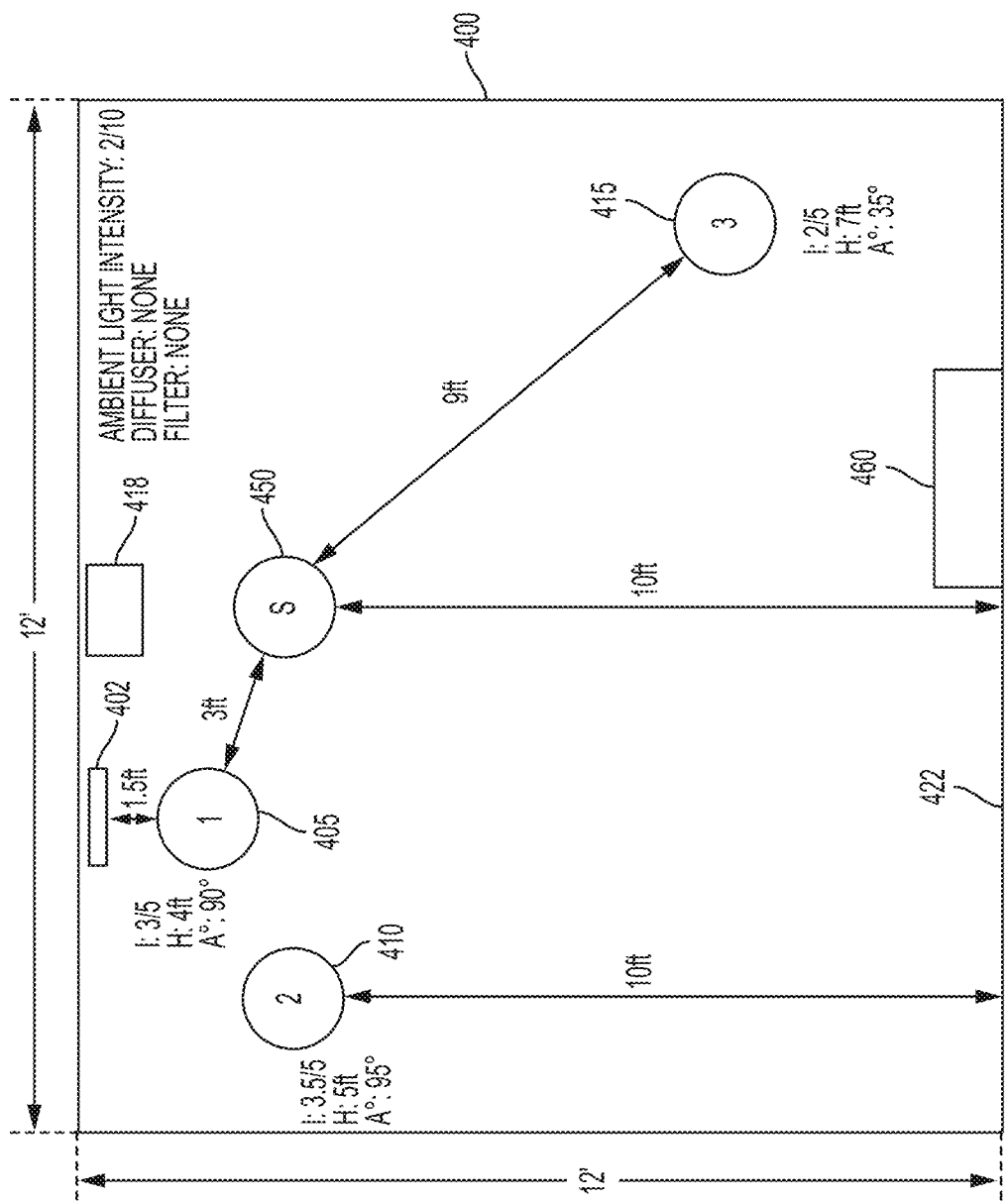
FIG. 4 depicts an illustrative setup of the lighting instruments in accordance with some embodiments of the present invention.

FIG. 4 depicts an illustrative setup 400 of the lighting instruments in accordance with some embodiments of the present invention. The setup 400 may be a preferred setup for a recording area of 12 feet by 12 feet and with an amount of ambient light of 2 measured by an ambient light sensor on a scale of 0 to 10, with 0 being no ambient light and with 10 being maximum ambient light in the recording area. The 0-to-10 scale is used to discuss the measurements for the purpose of simplicity and it may not reflect the actual measurement or number measured by the sensor. The actual measurement or number can be determined from these measurements. Other scales may also be adopted and the actual measurement or number can also be determined accordingly. The setup 400 (and the setup 500 below) involves three lighting instruments and the light source of each lighting instrument is a 7-watt dimmable LED bulb that is 50-watt halogen equivalent. No diffusor or filter is utilized to modify the light produced by any of the lighting instruments in either setup.

In the setup 400, the first lighting instrument 405 is positioned approximately 3 feet away from the subject 450 and 4 feet above the installation surface and is angled at approximately 90 degrees. The angle is measured from a 180-degree axis perpendicular to the installation surface. For example, the instrument 405 may be installed on a stand that is placed on the floor. When the instrument 405 is adjusted with its light emitting straight up (e.g., toward the ceiling), the instrument 405 is angled at 180 degrees. When the instrument 405 is adjusted with its light emitting straight down (e.g., toward the floor), the instrument 405 is angled at 0 degree. The 90-degree angle leads the center of the instrument 405 to face in a direction parallel to the floor. The first lighting instrument 405 is positioned approximately 1.5 feet away from a white board 402 that is used to reflect the light emitted by the first lighting instrument 405. The first lighting instrument 405 is set up off to one side of the subject 450 from the side facing the camera 418 such that the first lighting instrument 405 is closer to the second instrument 410 compared to the third lighting instrument 415. The light intensity is set to 3 on a scale of 0 to 5, with 0 being no light and with 5 being maximum intensity. The same scale applies to the other light intensities described in the remaining description of the setups, and the light intensity of each lighting instrument may be determined and set by the software module (discussed below) or set by the user. The 0-to-5 scale is used to discuss the measurements for the purpose of simplicity and it may not reflect the actual measurement or number measured by the sensor. The actual measurement or number can be determined from these measurements. Other scales may also be adopted and the actual measurement or number can also be determined accordingly. The subject 450 is approximately 10 feet away from the back wall 422 of the recording area.

The second lighting instrument 410 is positioned approximately 10 feet away from the back wall 422 and 5 feet above the installation surface. The second lighting instrument 410 is angled at approximately 95 degrees (or 5 degrees above the parallel direction). The light intensity is set to 3.5. The third lighting instrument 415 is positioned behind the subject 450, and is positioned approximately 9 feet away from the subject 450 and 7 feet above the installation surface. The third lighting instrument 415 is angled at approximately 35 degrees (or 55 degrees below the parallel direction). The third lighting instrument 415 is angled downward since the instrument 415 is at 7 feet and the subject is below that height. The light intensity is set to 2. From the view of the camera 418, the second lighting instrument 410 is on the right of the subject 450 and the third lighting instrument 415 is on the left of the subject 450. The second lighting 410 and/or third lighting instrument 415 may or may not appear in the view of the camera 418 during recording depending on the user's need.

Figure 5:
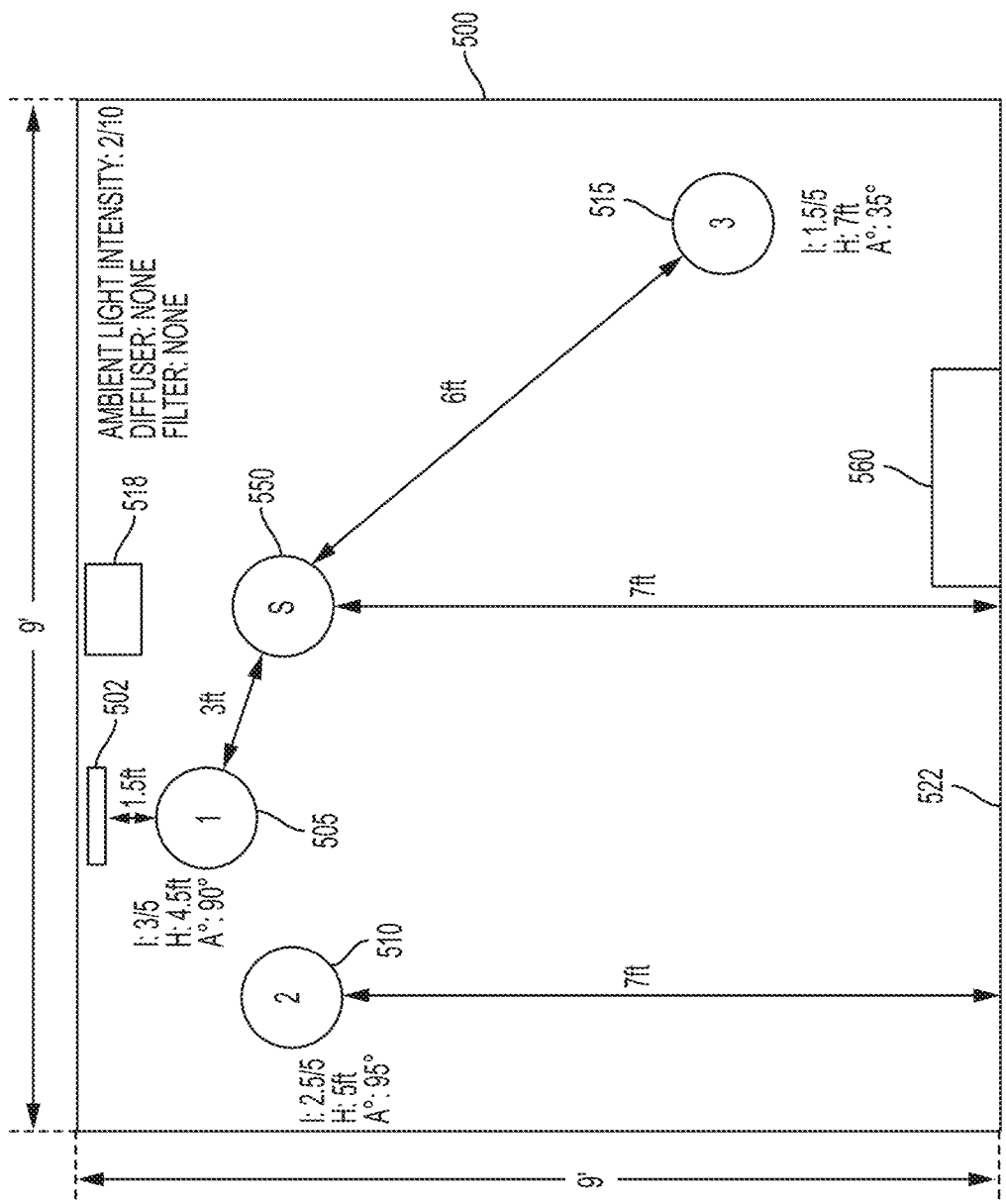
FIG. 5 depicts another illustrative setup of the lighting instruments in accordance with some embodiments of the present invention.

FIG. 5 depicts another illustrative setup 500 of the lighting instruments in accordance with some embodiments of the present invention. The setup 500 may be a preferred setup for a recording area of 9 feet by 9 feet and with an amount of ambient light of 2 measured by an ambient light sensor on a scale of 0 to 10, with 0 being no ambient light and with 10 being maximum ambient light in the recording area. The setup 500 involves the same number of lighting instruments and same type of light sources. No diffusor or filter is utilized to modify the light produced by any of the lighting instruments.

In this setup, the first lighting instrument 505 is positioned approximately 3 feet away from the subject 550 and 4.5 feet above the installation surface and is angled at approximately 90 degrees. The first lighting instrument 505 is positioned approximately 1.5 feet away from a white board 502 that is used to reflect the light emitted by the first lighting instrument 505. The first lighting instrument 505 is set up off to one side of the subject 550 from the side facing the camera such that the first lighting instrument 505 is closer to the second instrument 510 compared to the third lighting instrument 515. The subject 550 is approximately 7 feet away from the back wall 522 of the recording area and the light intensity is set to 3.

The second lighting instrument 510 is positioned approximately 7 feet away from the back wall 522 and 5 feet above the installation surface. The second lighting instrument 510 is angled at approximately 95 degrees. The light intensity is set to 2.5. The third lighting instrument 515 is positioned behind the subject 550 and is positioned approximately 6 feet away from the subject 550 and 7 feet above the installation surface. The third lighting instrument 515 is angled at approximately 35 degrees. The light intensity is set to 1.5. From the view of the camera 518, the second lighting instrument 510 is on the right of the subject 550 and the third lighting instrument 515 is on the left of the subject 550. The second lighting 510 and/or third lighting instrument 515 may or may not appear in the view of the camera 518 during recording depending on the user's need.

In FIGS. 4 and 5, the white board may be angled toward the subject at approximately a 45 degree angle so that the light reflects in the direction of the subject. The second lighting instrument may be pointed toward the center of the back wall or the logo (the logo can be positioned at the center of the back wall or other position). The third lighting instrument may be pointed at the person's head and shoulders if the subject is a person.

Figure 6:
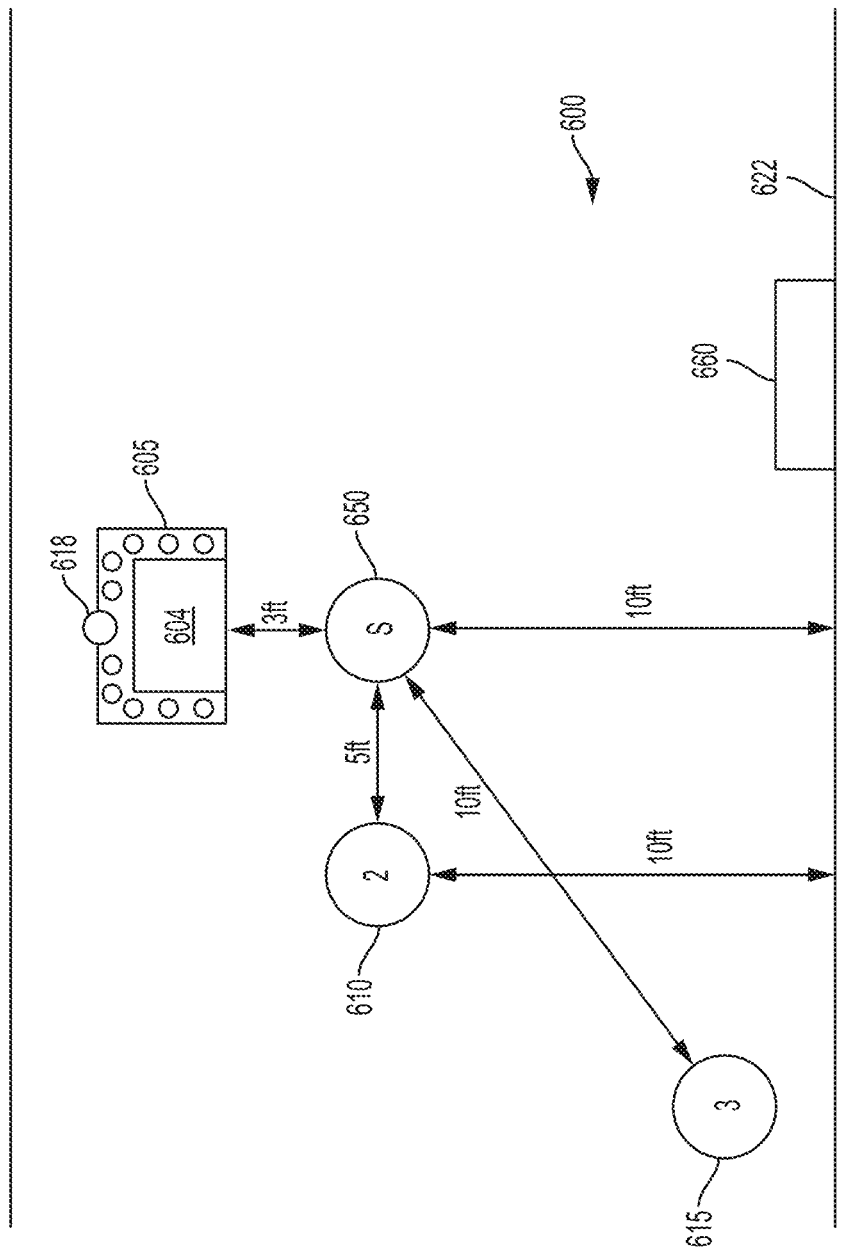
FIG. 6 depicts another illustrative setup of the lighting instruments in accordance with some embodiments of the present invention.

FIG. 6 depicts another illustrative setup 600 of the lighting instruments in accordance with some embodiments of the present invention. The setup 600 involves a first lighting instrument 605 including three panels running around the perimeter of a display 604. Each panel includes a 5-watt light source that operates at a color temperature of 3000 Kelvin. The setup 600 also involves a second lighting instrument 610 and a third lighting instrument 615 that each operates at a color temperature of 5000 Kelvin. A color filter or gel is applied to the first lighting instrument 605 to alter its color to resemble color emitting at about 5000 Kelvin.

In this setup, the first lighting instrument 605 and the display 604 are positioned approximately 3 feet away from the subject 650 and is angled at approximately 90 degrees. The first lighting instrument 605 is set up directly in front of the subject. The light intensity is set to 4 and the subject 650 is approximately 10 feet away from the back wall 622 of the recording area. The second lighting instrument 610 is positioned to a side of the subject 650 and is approximately 5 feet away from the subject 650 and 10 feet from the back wall 622. The second lighting instrument 610 is installed at about the same height as the logo 660 on the back wall 622. The light intensity is set to 4. The third lighting instrument 615 is positioned behind the second lighting instrument 610 and is positioned approximately 10 feet away from the subject 650 and 8 feet above the installation surface. The light intensity is set to 1.5. From the view of the camera 618, the second lighting instrument 610 and the third lighting instrument 615 is on the same side from the subject 550 (e.g., both are on the right side of the subject 650). The second lighting 610 and/or third lighting instrument 615 may or may not appear in the view of the camera 618 during recording depending on the user's need.

In any of the above three setups, the lighting instruments illuminate the subject 450, 550, 650 and the logo 460, 560, 660 on the back wall 422, 522, 622 with studio quality intensity. The light intensities discussed may be the intensities determined by the software module in that situation.

Each of the second and third lighting instruments may comprise a distance senor, an ambient light meter, location sensor, height sensor, or a combination thereof with functions discussed above.

The first lighting instrument may provide the main light to the subject and the second and third lighting instruments may provide secondary light to the subject. In other words, the subject may receive more light from the first lighting instrument compared to other lighting instruments (the first lighting instrument may provide light intensity stronger than other lighting instruments, or both). The first lighting instrument may also be known as the main lighting instrument, the second lighting instrument may also be known as the fill lighting instrument, and the third lighting instrument may also be known as the spot light lighting instrument.

The total number of lighting instruments and the number of each lighting instrument may depend on the location where the subject is, the amount of ambient light in that location, and the user's need. For example, only the first lighting instrument may be needed or the user may only need the first and second lighting instrument to professionally illuminate the subject. As another example, one first lighting instrument may be utilized, two second lighting instruments may be utilized, and four third lighting instruments may be utilized.

The light sources on each lighting instrument are configured to produce constant light once they are turned on, but they may also be configured to produce flash light if needed.

The description will now turn to a method of operating a lighting system. In one embodiment, the lighting system may be the system discussed above comprising three lighting instruments and the method may operate such system. The method may orchestrate the three lighting instruments to preferably provide studio quality light, establish a primary focus, and control highlights and shadows.

The method may be implemented as a software module that can either be downloaded as an application, installed on the operating system or integrated into or part of the operating system. The module may be compatible with Windows, iOS, Android-based operating system, or other operating system. The module may be installed in a computer or mobile device, or part of the operating system, to perform its functions and allow the user to operate the module. The computer may be a desktop computer, laptop computer, or other similar device. The mobile device may be a smartphone, personal digital assistant (PDA), iPad, tablet, or the like. Once installed, the computer instructions of the module may be stored in non-volatile (non-transient) memory (e.g., programmable logic) and executed by a microprocessor of the computer or mobile device. Through the instructions, the microprocessor can communicate with the lighting instruments to carry out the functions described in this disclosure. The lighting instruments include the necessary hardware (e.g., wireless transceiver, microprocessor, sensor, etc.) to communicate with the microprocessor. The communication may be established by Bluetooth, Wi-Fi, 802.11, 802.16, infrared, Zigbee, near-field communications (NFC), wireless USB, radio technology, cellular networks (2G, 3G, 4G, etc.), or other wireless communication protocols. The communication may also be established by using wires such as coaxial cables, twisted pair cables, patch cables, optical fibers, other networking cables or by buses such as USB. The module may be installed on the same computer or mobile device that has the first lighting instrument attached to its display or on a different computer or device. The module may be referred to as a module residing on the computer or mobile device and the entire module may reside on the computer or mobile device without utilizing the central hub described below in some embodiments. The method is also applicable to implementation as a non-transitory computer readable medium. A combination of hardware and software implementation is also contemplated.

Figure 7:
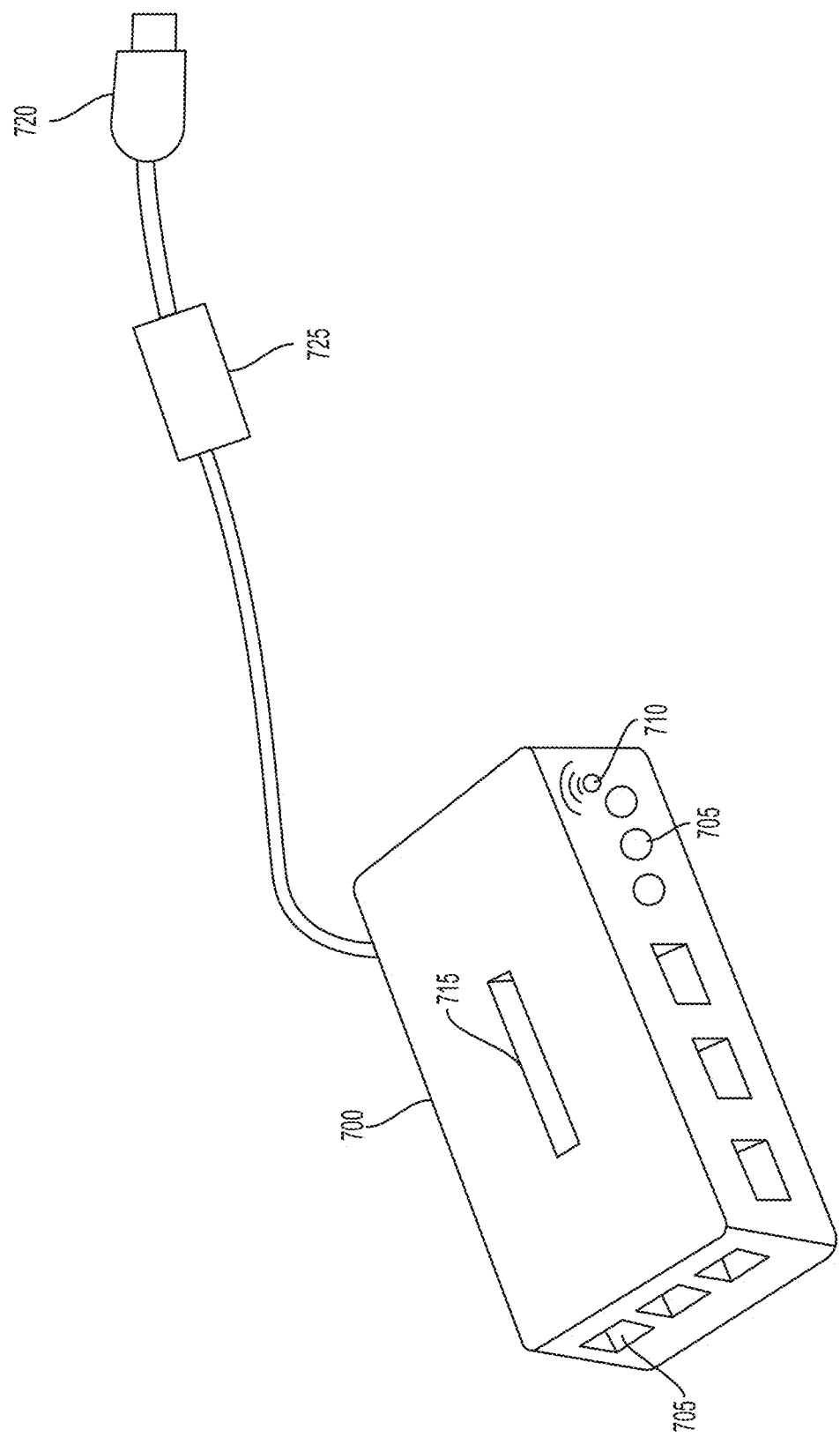
FIG. 7 depicts an illustrative central hub in accordance with some embodiments of the present invention.

The software module can also be implemented in an electronic device (e.g., a central hub, a hardware controller, or a hardware module) with electrical connections (e.g., wired connections, wireless connections, or a combination thereof) that can connect lighting instruments (including ones manufactured by a third party that meet the device's power requirement) and the computer/mobile device to the electronic device. FIG. 7 depicts an illustrative central hub 700 in accordance with some embodiments of the present invention. The central hub 700 may include a hardware port 705 (e.g., female connector), a wireless transceiver 710, an electrical connector 715 configured to receive a docking mechanism (FIG. 9), and a power supply connector 720. The hardware port 705 may be configured to receive wires such as coaxial cables, twisted pair cables, patch cables, optical fibers, or other networking cables or buses such as USB. The wireless transceiver 710 may include network ports and be configured to operate on Bluetooth, Wi-Fi, 802.11, 802.16, infrared, Zigbee, near-field communications (NFC), wireless USB, radio technology, cellular networks (2G, 3G, 4G, etc.), or other wireless communication protocols. The central hub 700 may include a light source that emits light when a communication is established via the port 705, the transceiver 710, or both the port 705, the transceiver 710. The electrical connector 715 may be a male (e.g., including pins or plugs) or female (e.g., including a socket, port, or jack) connector that can insert into or receive the corresponding connector on the docking mechanism. The electrical connector 715 may be serial or parallel-based connection. The hardware port 705 and the electrical connector 715 may support the same types of wired or physical connection, but the hardware port 705 is configured to connect with the lighting instruments whereas the electrical connector 715 is configured to connect with the docking mechanism. The electrical connector 715 can secure (e.g., fix) the docking mechanism to the central hub 700 so that the docking mechanism is immobile with respect to the central hub 700.

The power supply connector 720 may be any type of connectors that can transfer power from a power source to the central hub 700 such as AC power plug, USB power plug, or other types of power plugs. The central hub 700 may optionally include an electrical transformer 725 that can reduce or increase the voltage of an alternating current received from the power source before the voltage is provided to the central hub 700. The central hub 700 operates on the received power. The central hub 700 may also provide the received power to the lighting instruments and the docking mechanism via the hardware port 705 and the electrical connector 715, respectively. The provided power may be the power required to operate the lighting instruments and the docking mechanism. The lighting instruments and the docking mechanism may also have their own power supply from other connections so that they do not need to depend on the power from the central hub 700. Whether the central hub 700 supplies the required power or not, connecting the lighting instruments and the docking mechanism to the central hub 700 always establishes a communication between the lighting instruments/docking mechanism and the computer/mobile device, between the lighting instruments/docking mechanism and the central hub 700, and between the central hub 700 and the computer/mobile device. The central hub 700 may optionally include a suction cup or similar device to secure the central hub 700 to a surface or to further secure the docking mechanism to the central hub 700.

In one embodiment, the lighting instruments can be plugged into the central hub 700 via the ports 705. In another embodiment, the lighting instruments can be wireless connected to the central hub 700 via the transceiver 710. The central hub 700 can communicate with the computer or mobile device wirelessly also via the transceiver 710 or a different transceiver. Once they are all connected, the software module in the central hub 700 may be provided to the user through the computer or mobile device and the user may use the software module to control the intensity and angle of the lighting instruments. The computer or mobile device may be installed with a graphical interface configured to operate the software module. Once an intensity or angle is selected or adjusted, the computer or mobile device sends a control instruction to the central hub 700 which in turn instructs the corresponding lighting instrument to change its intensity or angle. The intensity or angle may also be selected or adjusted by the central hub 700 based on the measurements received from the sensors, which may be included in the central hub 700 or the lighting instruments, without input from the user. The measurements from sensors may also be transmitted to the central hub 700 and computer or mobile device for calculating the optimal intensity or angle and for displaying to the user. The central hub 700 includes the necessary hardware to receive and transmit these instructions, determine the appropriate intensity, direction, and angle, control color temperature of the lighting instruments, and perform other functions. The central hub 700 includes a microprocessor that executes the algorithms in the module configured to determine the optimal intensity and angle. The software module may include the functionality of a light board, DMX relay, dimmer pack, or other similar devices.

Figure 8:
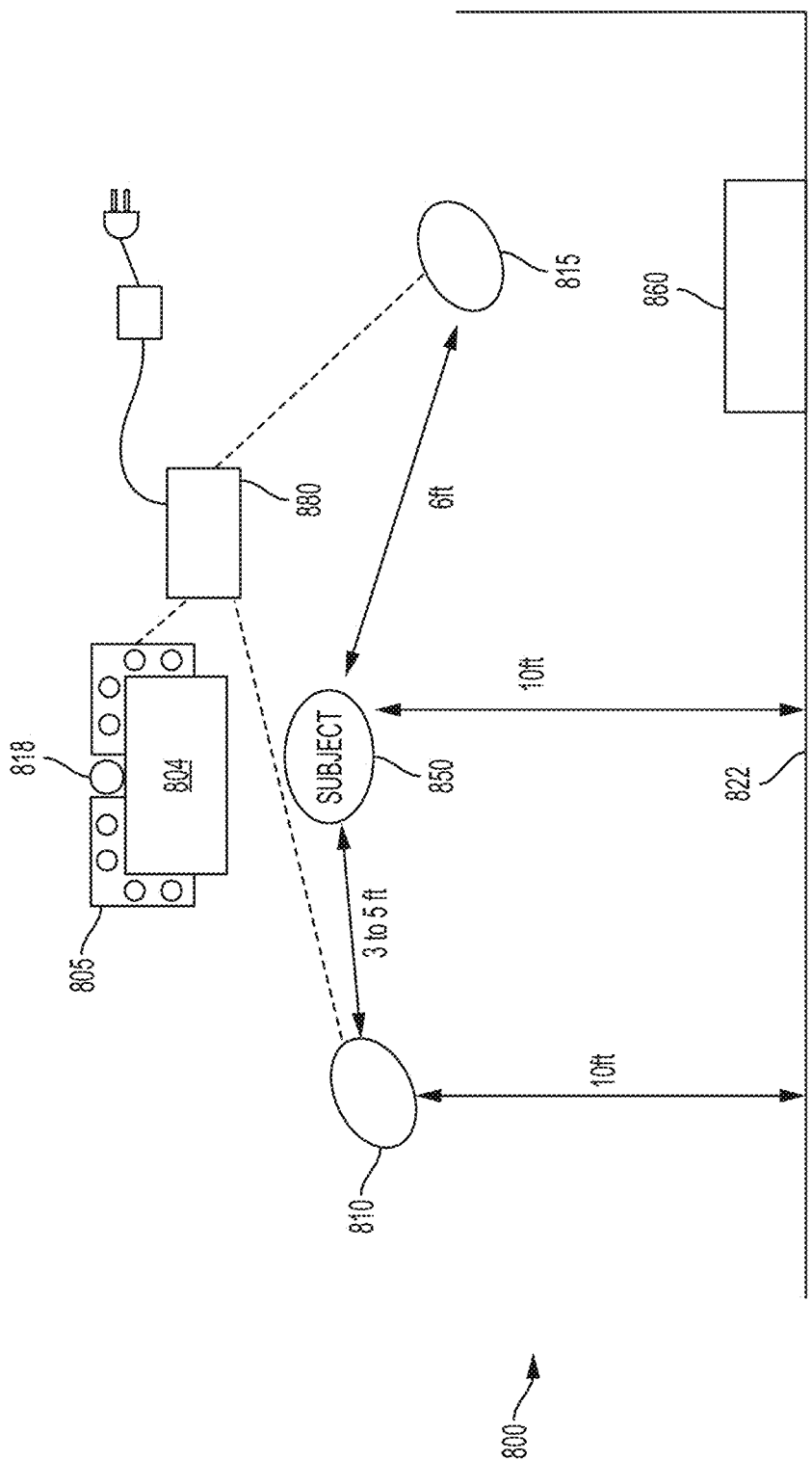
FIG. 8 depicts an illustrative setup of the lighting instruments with the central hub in accordance with some embodiments of the present invention.

FIG. 8 depicts an illustrative setup 800 of the lighting instruments with the central hub in accordance with some embodiments of the present invention. The central hub 880 is connected to an electrical outlet via its AC power plug. The powered central hub 880 can communicate with the lighting instruments 805, 810, 815 and each of the lighting instruments 805, 810, 815 is wirelessly connected to the central hub 880. The first lighting instrument 805 is installed on the perimeter of a display 804 with the web camera 818 exposed. The second lighting instrument 810 is positioned to one side of the subject 850 (or the first lighting instrument 805) and is positioned between 3-5 feet from the subject 850 and approximately 10 feet from the wall 822. The subject 850 is also located at about 10 feet from the wall 822. The third lighting instrument 815 is positioned to another side of the subject 850 (or the first lighting instrument 805) that is opposite to the one side. The third lighting instrument 815 is positioned at approximately 6 feet from the subject 850 and closer to the wall 822 compared to the second lighting instrument 810. The user may manually select or adjust the light intensity, the light angle, or both the light intensity and the light angle from the display of the computer or the mobile device that is also wirelessly connected to the central hub 880. The computer or mobile device may be installed with a graphical interface configured to control the software module in the central hub 880. The user may also allow the central hub 880 to make its own determination for the appropriate light intensity, light angle, or both and then adjust accordingly. The central hub 880 may communicate with each lighting instrument individually by sending a specific control instruction to each lighting instrument. In some embodiments, the lighting instruments are only connected to the computer or mobile device and the user operates the computer or mobile device to communicate with the central hub 880 to receive the control instruction that governs the appropriate light intensity and angle. The central hub 880 generates that instruction from the algorithms in the software module and the measurements obtained from the sensors on the central hub 880. The central hub 880 may send one single control instruction to the computer, and the microprocessor of the computer may process the instruction into separate signals and send each signal to the corresponding lighting instrument so the light intensity and angle of the corresponding lighting instrument can be changed accordingly.

When the module is implemented on a microprocessor of a computer or mobile device in one embodiment of the invention, the lighting instruments may be connected to the computer or mobile device through a wired or wireless connection. The lighting instruments may also be connected to each other through a wired or wireless connection. The wired or wireless connection may be one of the communications standards discussed above. The connection between the lighting instruments and the connection between the lighting instruments and the computer/mobile device may be the same or different communications standard. When a wired connection is adopted, the first lighting instrument and the second lighting instrument may be connected by a cable, the first lighting instrument and the third lighting instrument may be connected by another cable, and the first lighting instrument may be connected to the computer or mobile device by another cable. In some embodiments, each lighting instrument may be connected to the computer or mobile device by a separate cable. The second lighting instrument and the third lighting instrument may also be connected by a cable if necessary.

Each lighting instrument may operate independently, such as communicating directly with the microprocessor to receive and transmit instructions and data to perform their respective function. In some embodiments, the operation of the second and third lighting instruments may depend on the operation of the first lighting instrument, such as communicating only with the first lighting instrument microprocessor to receive and transmit instructions and data to perform their respective function. In this scenario, only the first lighting instrument directly communicates with the microprocessor.

When the module is implemented on a central hub as previously discussed, the lighting instruments may be connected to the central hub through a wired or wireless connection. The lighting instruments may also be connected to each other through a wired or wireless connection, in addition to being connected to the central hub. The central hub is connected to the computer or mobile device through a wired or wireless connection. The wired or wireless connection may be one of the communications standards discussed above. These connections may be the same or different communications standard. In this scenario, the central hub may control each lighting source independently. In some embodiments, the first lighting instrument may be the only instrument connected to the central hub and the second and third lighting instrument are connected to the first lighting instrument. The first lighting instrument can communicate with the central hub to receive and transmit instructions and data and control the second and third lighting instrument based on the received instructions and data.

In FIGS. 6 and 8, the second lighting instrument may be pointed toward the center of the back wall or the logo (the logo can be positioned at the center of the back wall or other position). The second lighting instrument may also be pointed toward the center of the back wall or the logo at approximately a 45 degree angle. The third lighting instrument may be pointed at the person's head and shoulders if the subject is a person.

Figure 9:
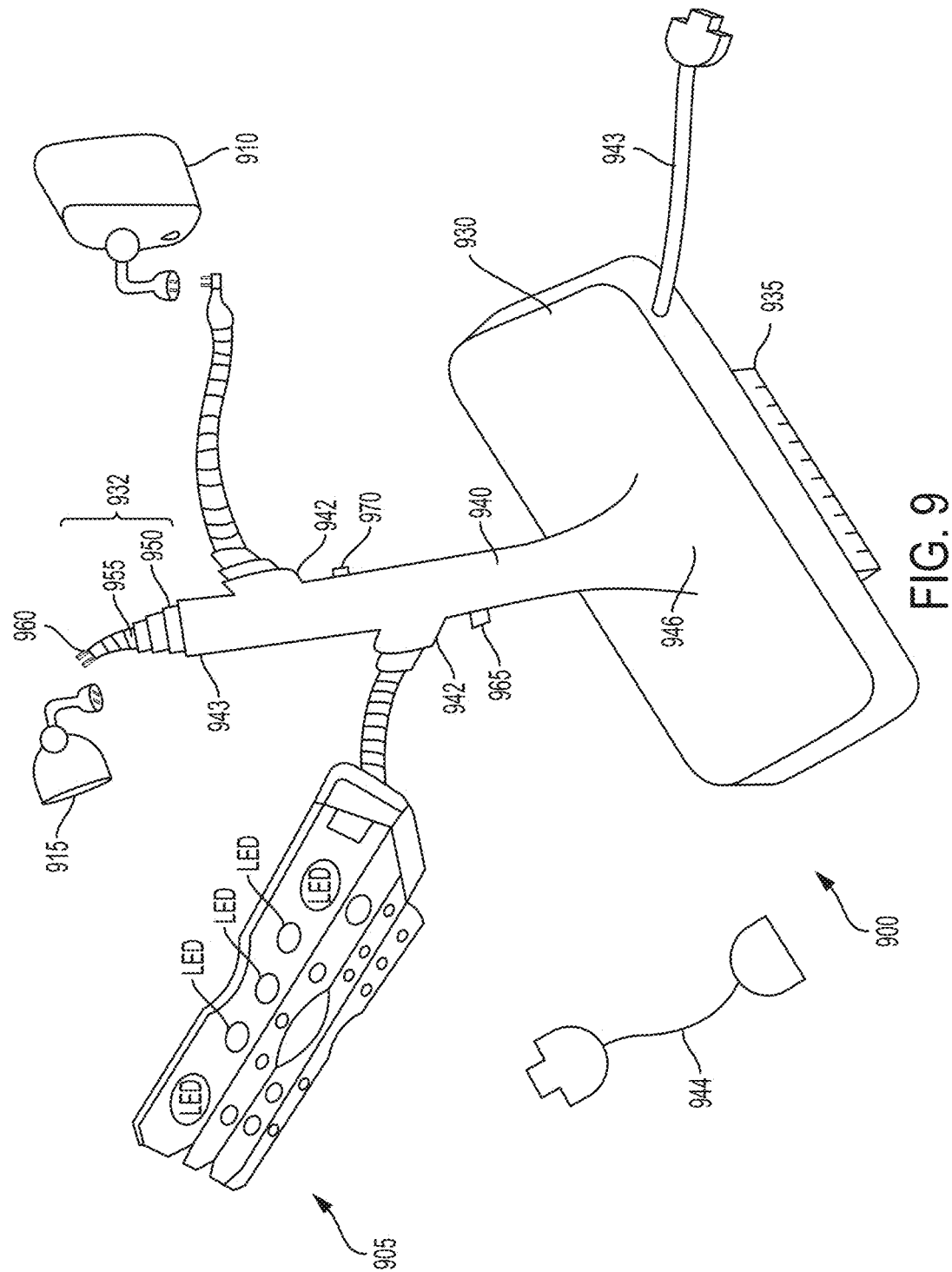
FIG. 9 depicts an illustrative docking mechanism in accordance with some embodiments of the present invention.

FIG. 9 depicts an illustrative docking mechanism 900 in accordance with some embodiments of the invention. The docking mechanism 900 comprises a base plate 930 having an electrical connector 935, a body 940 extending from the base plate 930, and a plurality of lighting instrument connectors 932. The electrical connector 935 and the body 940 are located on the opposite sides of the base plate 930. The electrical connector 935 may be a male (e.g., including pins or plugs) or female (e.g., including a socket, port, or jack) connector that can insert into or receive the corresponding connector on the central hub. The body 940 is preferably a hollow cylinder that can accommodate electrical wires and circuitry in the hollow section. The body 940 may have more openings 942 or extensions in addition to the top 943 and bottom 946 opening to accommodate the lighting instrument connectors 932. The base plate 930 and the body 940 (except the lighting instrument connectors 932) are immobile with respect to the central hub once the docking mechanism 900 is connected to the central hub. The docking mechanism 900 and the central hub can be attached or detached depending on the user's usage. The docking mechanism 900 may include built-in circuitry that transmits instructions and measurements to the central hub and the lighting instruments and that receives instructions and measurements from the central hub and the lighting instruments.

The docking mechanism 900 may also include a power cable 943 (e.g., AC power cable or USB power cable) so that the mechanism 900 can separately powered without depending on the power from the central hub to operate. Additional power cables 944 may be used to power the lighting instruments 905, 910, 915 separately as well. In some embodiments, one lighting instrument may be separately powered through a separate power cable or power source while another lighting instrument may be powered by the power received from the power cable 942 or the central hub.

In some embodiments, the built-circuitry is not required since the lighting instruments, the central hub, and the computer can communicate wirelessly. In this situation, the electrical connector 935 and the electrical connector 715 are structural connectors (male or female) configured to provide only structural connection (no electrical connection) that secures the docking mechanism 900 and the central hub to each other.

Each of the lighting instrument connectors 932 comprises a telescoping arm 950 and a retractable gooseneck connector 955. The telescoping arm 950 is configured to slide toward and away from the opening on the body 940. The telescoping arm 950 has a reduced length when it is slid toward the opening and an extended length when it is slid away from the opening. The telescoping arm 950 has one end connected to the opening and another end connected to the retractable gooseneck connector 955. The gooseneck connector 955 is inserted into a hole of the arm 950 to be secured to the body 940 and includes an end 960 to be connected to the lighting instrument that provides electrical connection to the lighting instrument. In one embodiment, the end 960 is an embedded male power connector. Electricity is provided from the wires or circuitry in the hollow section of the body 940 to the end 960. The end 960 is configured to fit the opening of the connecting mechanism (FIG. 2, 226) or the power connector (FIG. 2, 227) of the lighting instrument. In some embodiments, the end 960 may provide only structural connection (with no electricity transmitted). The gooseneck connector 955 can be shortened or lengthened and be adjusted to any angle. The lighting instrument on the gooseneck connector 955 can also be turned, swung, rotated, swiveled, or moved to any angle.

The body 940 may comprise a first switch mechanism 965 configured to adjust the height of the body 940 and a second switch mechanism 970 configured to release the gooseneck connector 955 from the body 940 (or to lock gooseneck connector to the body). When the first switch mechanism 965 is activated (e.g., depressed, turned, or touched), the height of the body 940 can be extended to another height farther from or closer to the base plate 930. When the second switch mechanism 970 is activated, the gooseneck connector 955 can be removed the body 940 (be locked to the body 940 once the gooseneck connector 955 is inserted). The first and second switch mechanism 965, 970 can be a button, knob, slider, or other mechanism suitable for actuation by a human.

The docking mechanism 900 can dock the three lighting instruments 905, 910, 915 and the docking mechanism 900 with the three lighting instruments 905, 910, 915 can serve as a desk lamp. The instruments 905, 910, 915 can be coupled to the docking mechanism 900 (via the connectors 932) when they are not deployed or packed for travel. In this instance, the docked lighting instruments 905, 910, 915 would remain fully functional and have the ability to establish 3-point studio lighting while the instruments remained docked on the docking mechanism 900. The docking mechanism 900 used to attach the lighting instruments 905, 910, 915 to the central hub 700 allows for the unit to be used as a traditional desk lamp with three light sources that can be deployed to establish a version of 3-point lighting, limited compared to previously discussed iterations only in its ability to physically move the instruments beyond what the docking mechanism 900 allows. All functions of the lighting instruments previously described may be accessible through the software module or through physically adjusting the instruments or the docking mechanism. All three instruments could be swiveled and moved to any position needed as a traditional desk lamp. As mentioned, the lighting instruments can also be deployed for 3 point studio lighting using the docking mechanism. This type of 3 point lighting deployment may allow for the first lighting instrument 905 to be positioned in front of the user in either a retracted (FIG. 9), semi-retracted or fully deployed (FIG. 1a) position using necessary extension connections. Whether the first lighting instrument 905 has a one-, two-, or three-panel configuration, they can all be attached to the docking mechanism 900. The docking mechanism 900 allows the user to adjust the height and direction of any of the three lighting instruments. The second lighting instrument 910 may be positioned on a flexible yet sturdy pole, rod, or telescoping arm on the docking mechanism that allows the instrument to be extended furthest away from the camera (approximately 20" or more) so that the maximum intensity can be used to illuminate a background without blowing out the lighting in the image captured by the video frame. Its height and direction can also be positioned and adjusted as needed. The third lighting instrument 915 attached to the docking mechanism 900 may also have the same flexibility and extension as the second lighting instrument 910 with the unique advantage of being able to extend and curl just above and beyond the subject. In the fully extended position, the third lighting instrument 915 may be preferably positioned approximately 3 inches above and 3 inches behind the subject with the explicit purpose being to provide the accent back lighting on the subject previously described.

When the lighting instruments 905, 910, 915 are deployed as a desk lamp, the user is able to achieve 3 point studio lighting without having to go to extensive measures to position the lighting instruments or additional lights in the recording area or without having to get up from his or her desk. The user can also couple one or more lighting instruments to the docking mechanism 900 and remove the remaining lighting instrument(s) and place them at other locations. In another iteration, the lighting instruments 905, 910, 915 may be permanently attached to the docking mechanism 900.

The lighting instruments can operate like PTZ (Pan, Tilt, Zoom) cameras so that each of the lighting instruments light angle and direction could be adjusted through panning and tilting via the software module. In some embodiments, it is the light sources of the lighting instrument that are being adjusted and the lighting instrument itself does not move. These operations allow the user to control the light angle and direction (in addition to intensity) directly from the computer or mobile device so that he or she does not need to move to where each lighting instrument is located to physically adjust each lighting instrument. Each lighting instrument can further include one or more barn doors to direct or limit light in certain directions. For example, the barn doors on the second lighting instrument can be moved to a position so that the light from the second lighting instrument does not splash on the person's shoulder, into the frame captured by the camera, or into the camera lens itself. The barn doors may have a square, rectangular, or other shape. The barn doors are external to the panel. Movement of the barn doors can also be adjusted through the software module. The sensors and meters in the lighting instrument can cause the lighting instrument, the light sources in the lighting instrument and/or the barn doors to pan, tilt, turn, or move. The sensors and meters can communicate directly with the lighting instrument to perform these movements without involving a microprocessor (of the computer/mobile device or the central hub) or can communicate with the lighting instrument via a microprocessor. In some embodiments, the sensors and meters are separate devices that are not embedded in the lighting instruments. The lighting instruments include the necessary mechanical structures and components to achieve all the movements described in this paragraph upon receiving the instructions or measurements. The adjusted light angle and direction may be the optimal angle and direction for the recording area.

The software module provides an operational panel that allows the user to interact with the module. The operational panel may be a graphical user interface including a set of commands. The commands may allow the user to enter commands and select choice from various menus displayed on the screen. Commands may include windows, icons, buttons, and the like. The user may utilize the commands through peripheral devices such as a keyboard, mouse, monitor, touch-screen, and the like. In one embodiment, the operational panel may include a lighting system activation command, recalibration command, manual control command, predetermined intensity selection command, proportional or inversely proportional intensity adjustment command, color temperature adjustment command, save command, and other commands for other features.

Figure 10:
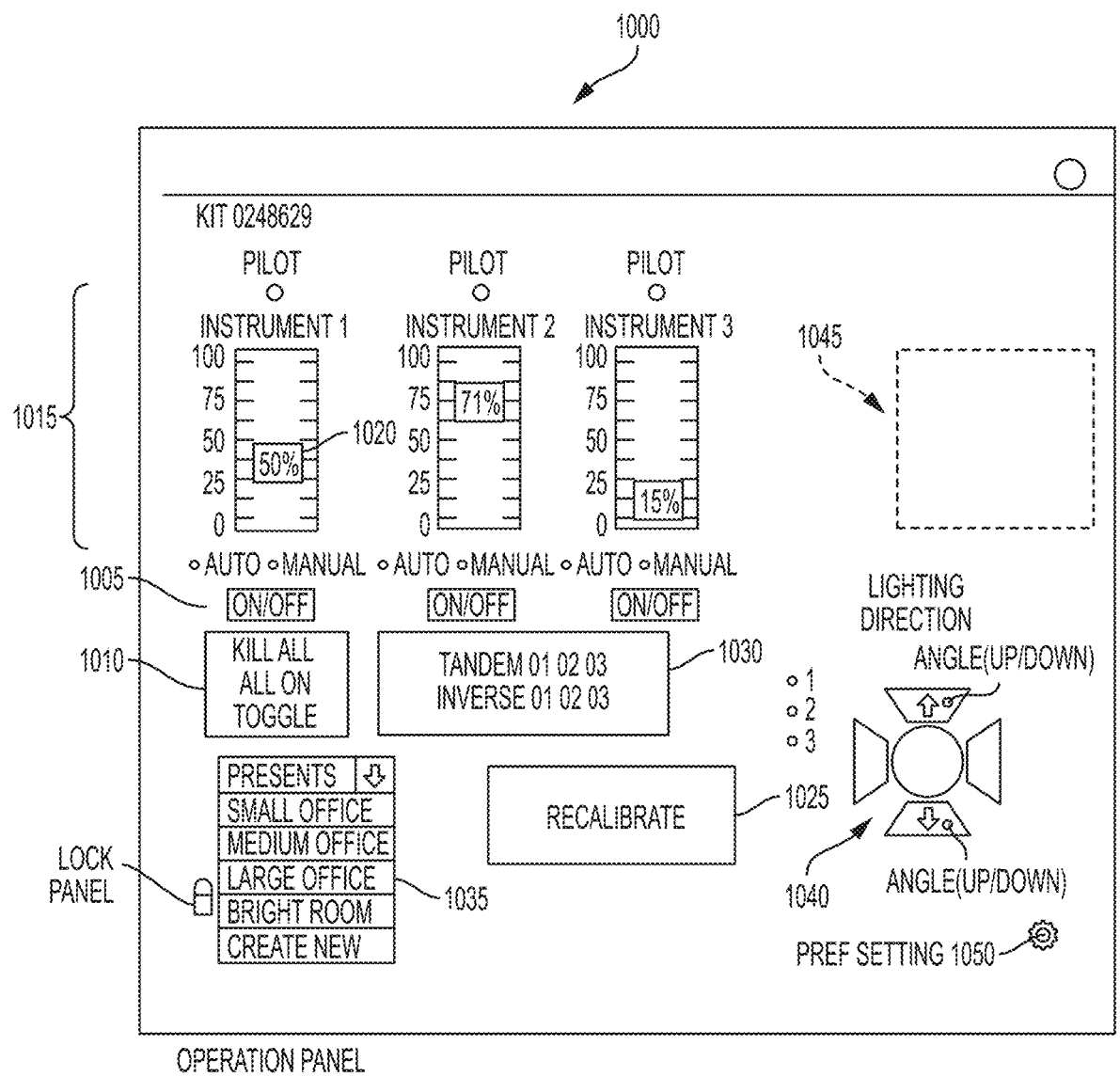
FIGS. 10 and 10a depict an illustrative operational panel in accordance with some embodiments of the invention.
Figure 10A:
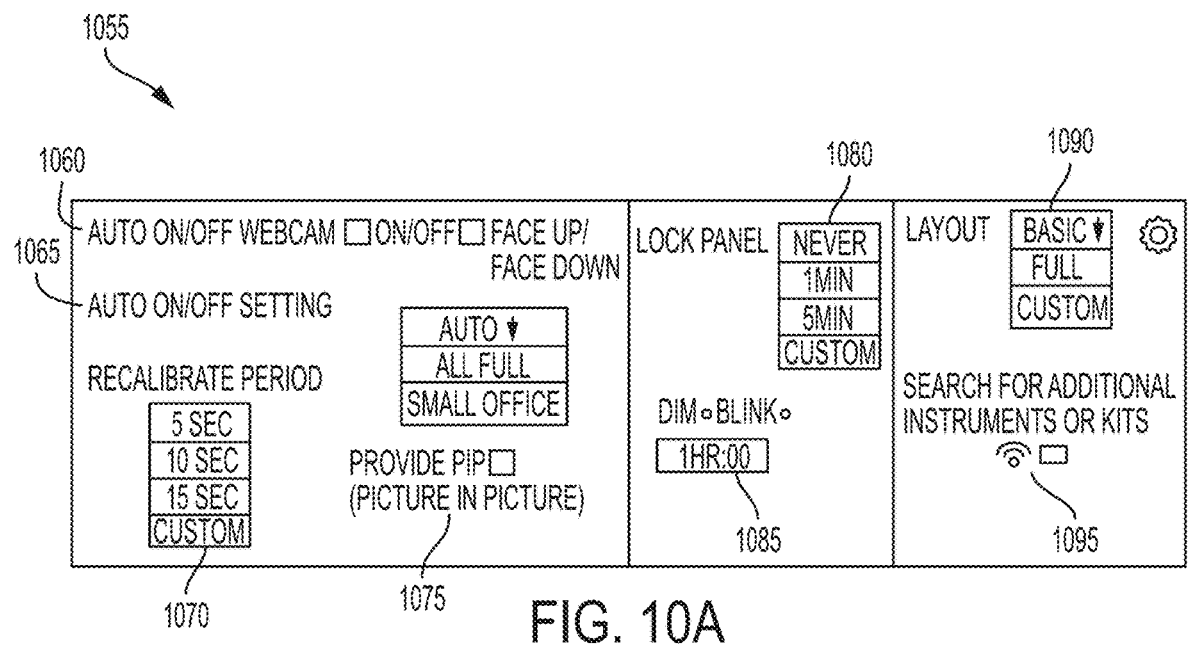

FIGS. 10 and 10a depict an illustrative operational panel 1000 in accordance with some embodiments of the invention. The operational panel 1000 includes a lighting system activation command 1005, 1010, a recalibration command 1025, a relationship command 1030, a predetermined intensity selection command 1035, a light angle adjusting command 1040, a window 1045 receiving a live feed from the camera and display the view of the camera, and preference setting command 1050.

The lighting system activation command 1005, 1010 may include an individual lighting instrument command 1005 and a system command 1010. The command 1005 may instruct each individual lighting instrument (and its sensors and meters) to turn on or off automatically or manually. The automatic or manual operation may depend on the camera's on/off operation. When a lighting instrument's automatic operation is activated, the lighting instrument or its light sources turn on when the microprocessor detects that the web camera is on and vice versa. When a lighting instrument's manual operation is activated, the lighting instrument or its light sources turn on only when the on command is activated and vice versa. The system command 1010 may instruct all the lighting instruments (and its sensors and meters) to turn on or off simultaneously or instruct the lighting instrument that is turned off to turn on and the lighting instrument that is turned on to turn off when the toggle command is activated.

When the lighting instrument is activated through either the command 1005 or the command 1010, the light sources on the lighting instrument emit light at an intensity. The intensity may be a default intensity or a determined intensity. The default intensity may be studio quality intensity for a specific distance without considering the distance measurement from the distance sensor, for a specific amount of ambient light without considering the ambient light measurement from the ambient light sensor, or a combination thereof. For example, the distance may be three feet and/or the brightness may be 5 based the 0-10 scale discussed above. The determined intensity may be studio quality intensity based on the actual distance between the subject and the lighting instrument measured by the distance sensor, based on the actual amount of ambient light in the recording area measured by the ambient light sensor, or a combination thereof.

The light intensity of each lighting instrument is shown in a display 1015. Although FIG. 10 only illustrates the light intensity of three lighting instruments, additional light intensity may be shown if additional lighting instruments are connected to the computer or the central hub. The display 1015 may be configured to receive manual adjustment on the intensity such as entering a number in a field 1020 that represents the level of intensity or sliding a cursor 1020 on a scale that presents the level of intensity. The selection between the automatic operation and the manual operation through the command 1005 may disable and enable the manual adjustment function, respectively. In some embodiments, the display 1015 allows manual intensity adjustment for each lighting instrument at any given time.

The relationship command 1030 may control whether an intensity adjustment to one lighting instrument should proportionally or inversely proportionally adjust the intensity of the remaining lighting instruments. For example, when the tandem command is selected, an increase in the intensity of the first lighting instrument would also proportionally increase the intensity of the second and third lighting instrument and vice versa. When the inverse command is selected, an increase in the intensity of the first lighting instrument would proportionally decrease the intensity of the second and third lighting instrument and vice versa.

The recalibration command 1025 may adjust the intensity of each lighting instrument to the intensity based on the actual distance between the subject and the lighting instrument, based on the actual amount of ambient light in the recording area, or a combination thereof. The recalibration command 1025 may instruct the corresponding sensor to make such a measurement and then calculate the intensity. In some embodiments, the recalibration command 1025 may instruct the sensor in the first lighting instrument to conduct a measurement, adjust the intensity of the first lighting instrument based on that measurement, and adjust the intensity of the other two lighting instruments based on the adjustment made to the first lighting instrument. The intensity adjustment of the other two lighting instruments may be executed proportionally or inverse proportionally to the intensity adjustment of the first lighting instrument. The intensity adjustment of the other two lighting instruments may also be executed with the light intensity of one lighting instrument adjusted proportionally to the intensity adjustment of the first lighting instrument and with the light intensity of another lighting instrument adjusted inverse proportionally to the intensity adjustment of the first lighting instrument. In some embodiments, the steps performed by the recalibration command 1025 may occur after a period of time. The period of time allows the user to reposition the subject in the recording area before the actual measurement and other steps occur. For example, the time may be 5 seconds or other duration. The actual measurement is then triggered upon expiration of the time and the remaining steps are performed. The time can be adjusted in the preference setting below.

The predetermined intensity selection command 1035 may include a plurality of predetermined intensities. Each of the intensities is created by the software module for a specific environmental condition, effect, or activity (e.g., small office, medium office, large office, bright room, etc.). The user may also create his or her own custom intensity and save it in the module, computer, or central hub. A predetermined intensity or the customized intensity may be selected by the user or the software module at any time after the lighting system is setup. A predetermined intensity may be selected by the software module according to methods discussed below. The predetermined intensity selected by the software module is one that provide studio quality lighting to the subject and/or recording area. If an optimal predetermined intensity is not available for selection, the software module can create a unique custom intensity for the lighting instruments.

The light angle adjusting command 1040 may change the light angle of a lighting instrument by adjusting one or more of the barn doors of the lighting instrument, adjusting the physical orientation of the lighting instrument or the light sources, or a combination thereof. The command 1040 may provide a 360 degree view of the lighting instrument and its barn doors and the lighting instrument and each barn door may be tilted, rotated, pivoted, swiveled, panned, etc.

The window 1045 is configured to receive a live feed from the camera and display the view of the camera. This is also known as the Picture-in-Picture (PIP) feature. This way, the user can immediately see the light effect on the subject created by the lighting instruments and make any adjustment if necessary since both the view and commands are available on the same screen or are simultaneously displayed to the user. The screen size of the operational panel 1000 is adjustable by the user. By default, the screen size should be as small as possible (e.g., consumes less than a half or preferably less than a quarter of the screen size of the display) and the operational panel 1000 should be as compact as possible (e.g., the commands are closely and neatly packed so that the space between the commands is smaller than the physical sizes of the commands, and the texts in the commands and the physical sizes of the commands are just large enough to be viewed and activated by the user). The operational panel 1000 may be dragged to different locations on the screen of the display. The user can drag the operational panel 1000 to a different location so he or she can access other programs on the display or computers such as desktop shortcuts. The user can also drag the operational panel 1000 to a different location so the operational panel 1000 does not cover the image or video received from the other party if the image or video is provided by a different program. In some embodiments, the live feed from the other party may also be gathered by and displayed in the operational panel 1000.

The preference setting command 1050 may include a plurality of subcommands 1055 configured turn on or off certain functions of the software module or the functions described with respect to FIG. 10. As shown in FIG. 10A, the subcommands 1055 may include a subcommand 1060 that instructs the software module to turn on or off the activation feature in relation to the camera's on/off operation, and a subcommand 1065 that instructs the software module to turn on or off the predetermined intensity feature and the predetermined intensity the lighting instruments should adopt once this feature is turned on. For example, when this feature is turned on and the small office setting is selected, the lighting system will always emit light in a manner according to the small office setting whenever the lighting system is activated and the intensities associated with the small office setting become the default intensities. The subcommands 1055 may also include a recalibration period subcommand 1070 that can be modified and that instructs the software module how long it should wait before it recalibrates. The period may be 5, 10, 15 seconds, or other duration. The subcommands 1055 may also include a PIP subcommand 1075 that can turn on or off the PIP feature. The subcommands 1055 may also include a lock panel subcommand 1080 that can determine the length of inactivity the software module should wait before the software module locks the operational panel to prevent access. For example, the length may be 1 minute, 5 minutes, never, or other length customized by the user. The subcommands 1055 may also include a dim/blink 1085 subcommand that may dim or blink one or more of the lighting instruments after a certain period of time regardless whether or not there is activity on the operational panel. This subcommand can receive indication from the user a period of time before the light of the lighting instruments makes an abrupt change in intensity. The abrupt change in intensity may denote to the user and viewer that the scheduled time for this activity is about to be over. The abrupt change may be one or more of the lighting instruments blinking, dimming up, dimming down, or a combination thereof. The subcommands 1055 may further include a layout subcommand 1090 that can change between a basic layout (e.g., less commands are displayed) and a full layout (e.g., more commands are displayed). Selecting a particular layout may activate and deactivate the corresponding commands and subcommands. The user may also create his or her own layout to control exactly what commands and subcommands he or she wants to see. The subcommands 1055 may further include a search subcommand 1095 that detects whether there are additional lighting instruments in the range of the already set up lighting instruments or the central hub and that connects the additional lighting instruments to the software module if they exist. In some embodiments, the subcommands may appear on the same screen as other commands instead of placing them under the preference setting command 1050.

The operational panel may also have a perpetual (i.e., continuous) distance sensing feature. This feature allows the software module to immediately detect any change in distance between the subject and the first lighting instrument (through the distance sensor) and make the necessary adjustment in intensity. This feature may also apply to the second and third lighting instruments. With this feature, intensity may change according to change in distance without the user selecting the recalibrate command.

The operational panel may further include other commands and subcommands such as color temperature changing command.

Figure 11:
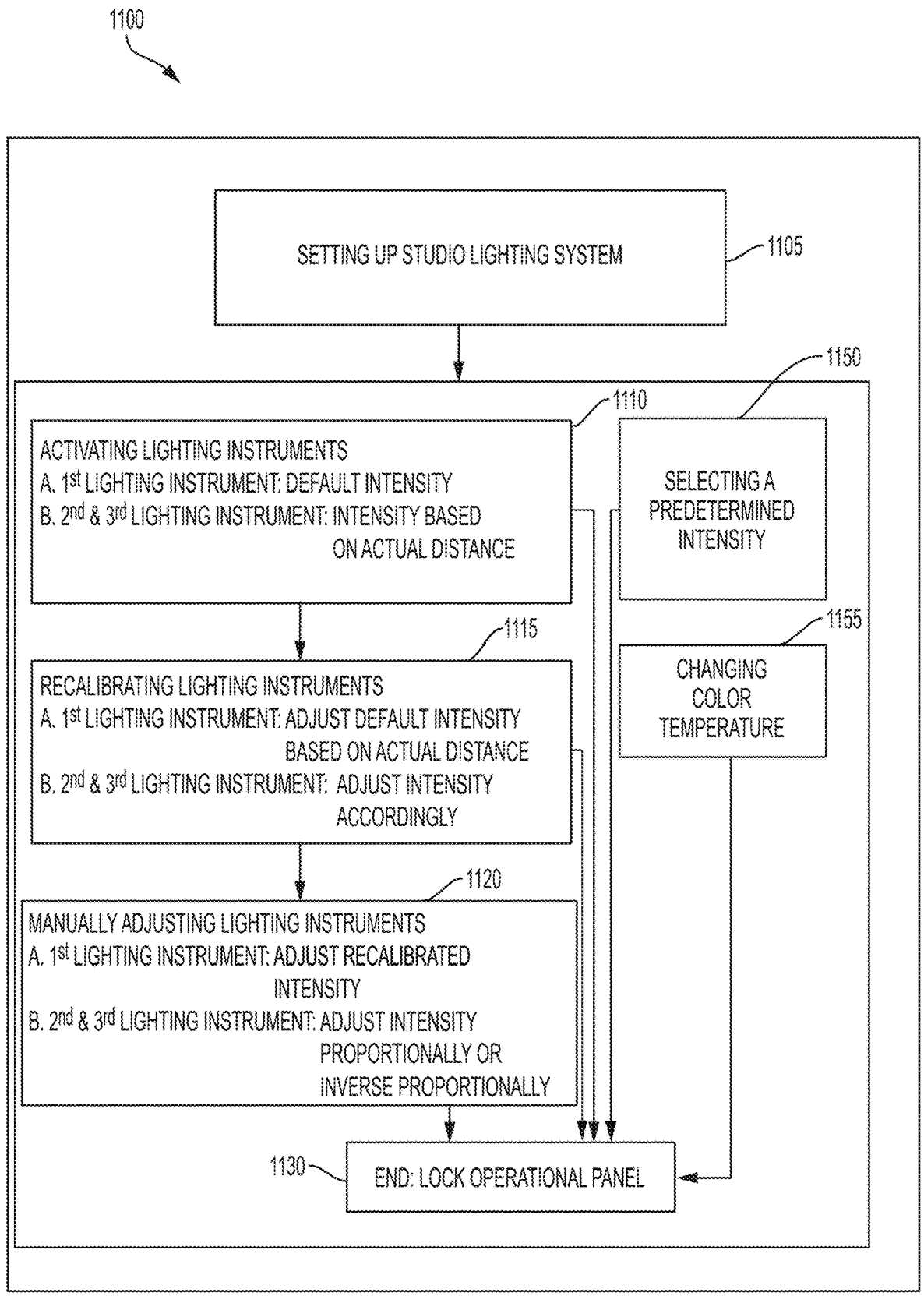
FIG. 11 depicts an illustrative method of operating a lighting system in accordance with some embodiments of the present invention.

FIG. 11 depicts an illustrative method 1100 of operating a lighting system in accordance with some embodiments of the invention. The method may commence with setting up 1105 the lighting system on a computer having a web camera and in a recording area. The first lighting instrument may be attached to the display of the computer as shown in FIG. 1, the second lighting instrument may be set up to a side of a subject in the recording area, and the third lighting instrument be set up to be behind and above the subject. The locations of the second and third lighting instruments may be locations one would expect when recording an image or video in a professional photographer or videographer's lighting studio. In these studios, emphasis is placed on arranging all light sources so as to establish primary focus on the subject in a fashion that prominently distinguishes the subject in the video image. The lighting instruments may also be relocated after setup if needed. Once the module is installed in the computer and executed, the computer is in communication with the lighting instruments and sensors and meters and an operational panel is displayed on the screen to allow the user to control the operation of the lighting system. If a central hub is utilized, the computer is connected to the central hub and the computer communicates with the lighting instruments and sensors and meters via the central hub. The module is preinstalled in the central hub and the computer communicates with the central hub to receive and display the operational panel. The microprocessor mentioned below may refer to the microprocessor of the computer or the central hub.

The method may comprise of activating 1110 the lighting instruments by the microprocessor on which the module is implemented. Activating the lighting instruments may also turn on the light sources and the sensors and meters on the respective lighting instrument. The lighting instruments may be activated simultaneously or with the first lighting instrument activated before the other two lighting instruments. Each lighting instrument may be activated and deactivated automatically in relation to a web camera's on/off operation. Each lighting instrument may be activated when the microprocessor detects that the web camera is on. Each lighting instrument may be deactivated when the microprocessor detects that the camera is off. The lighting instruments may also be activated by the user through the individual lighting instrument command, irrespective of the camera's on/off operation, which sends instructions to the microprocessor to turn on or off the lighting instruments. The individual lighting instrument command may be a function provided by the module allowing the user to manually turn on or off the lighting instruments.

When the lighting instrument is activated, the light sources on the lighting instrument may emit light at a default intensity. The light sources may fade up from no light to the default intensity. When the lighting instrument is deactivated, the light sources may emit no light. The light sources may fade down from the default intensity to no light. For the first lighting instrument, the default intensity may be studio quality intensity for a specific distance without considering the distance measurement from the distance sensor. For example, the distance may be three feet. Each of the second and third lighting instruments may fade up to an intensity that is suitable for the subject based on the actual distance between the subject and the respective lighting instrument.

If the intensity of each lighting instrument is suitable for the recording area, then the user accepts the setting and the method ends here 1130. No further adjustment is needed and the operational panel may be locked 1130 to prevent unauthorized access and accidental access.

If further adjustment is required, the method may proceed to recalibrating 1115 the intensity of the lighting instruments by the microprocessor. The recalibrating step may include measuring the actual distance between the subject and the first lighting instrument, adjusting the intensity of the first lighting instrument from the default intensity to a studio quality intensity based on the measurement, and adjusting the intensity of the other two lighting instruments based on the adjustment made to the first lighting instrument. In some embodiments, the recalibrating step may include providing a period of time allowing the user to reposition the subject in the recording area before the actual distance measurement. For example, the time may be 5 seconds or other duration. The actual distance measurement is then triggered upon expiration of the time. The lighting instruments may be recalibrated automatically after the activation step or manually by the user through the recalibration command which sends instructions to the microprocessor to execute the recalibration.

For example, the recalibrating step 1115 measures that the actual distance between the subject and the first lighting instrument is 3 feet and the first lighting instrument has an intensity of 450 lumens. The intensity is too strong for the subject and the step 1115 can reduce the intensity to 25% or 112.5 lumens that is considered to be studio quality intensity for that distance. If an ambient light sensor is used with the lighting system, the step 1115 can consider the reading from the ambient light sensor in adjusting the intensity. The other two lighting instruments can change their intensity according to the adjusted intensity. For instance, if the second lighting instrument is placed 6 feet behind the subject from the first lighting instrument and is pointed at the back of the subject, the subject is 3 feet away from the first lighting instrument and 3 feet away from the second lighting instrument. Before adjustment, the second lighting instrument has an intensity of 450 lumens and the step 1115 can also reduce that intensity to 25% or 112.5 lumens based on the adjustment made to the first lighting instrument. The 75% reduction in intensity may be executed whenever the step 1115 determines that the distance between the subject and the lighting instrument is 3 feet or when the step 1115 determines that such amount of reduction is optimal. In some situations, the intensity of the second lighting instrument may have a different amount of reduction when the distance between the subject and the first lighting instrument and the distance between the subject and the second lighting instrument are the same (e.g., 30%, 50%, etc.). In some situations, the intensity of the second lighting instrument may be increased instead of being reduced. The same concept also applies to the third and additional lighting instruments. In some situations, the adjustment to the intensity of the second, third, additional lighting instrument can be made without considering the distance between the subject and the first lighting instrument.

Moreover, in determining the optimal intensity adjustment for a lighting instrument other than the first lighting instrument (which can be the second or third lighting instrument, and is referred to as support lighting instrument), the step 1115 can further consider the direction which the supporting lighting instrument is pointed, the location of the support lighting instrument, the maximum lumens of the support lighting instrument, or a combination thereof after the distance between the subject and the first lighting instrument is measured. These information are obtained from sensors that provide such information to the microprocessor. The support lighting instrument may be set up to illuminate the background or an object other than the subject, and the distance between the subject and the support lighting instrument may not be as relevant as the distance between the background or subject and the support lighting instrument. The step 1115 can determine the factors that are more important for adjusting the intensity of the lighting instrument.

The determination of the optimal adjustment can operate in two modes. In the first mode, the determination includes calculating the distance between the subject and the support lighting instrument from (1) the distance between the support lighting instrument and the first lighting instrument and (2) the distance between the subject and the first lighting instrument. In the second mode, the determination includes calculating the distance between the support lighting instrument and the closest object to the support lighting instrument which may or may not be the subject.

The second, third, or additional lighting instrument (support lighting instrument) may be set up to point in a direction different from the direction facing the subject. In those situations, the lighting instrument can calculate its distance to the object that it is pointing to (e.g., background) and adjust intensity based on that distance. The calculation and adjustment may be independent of the calculation and adjustment of another lighting instrument.

When locations sensors are not used by the lighting system, the lighting system may not know which lighting instrument is not pointed in the direction of the subject. In these situations, the second and third lighting instruments (or instruments other than the first lighting instrument) may have a subject/object switch on it. When the switch is turned to "subject," the lighting instrument performs the first mode. When the switch is turned to "object," the lighting instrument performs the second mode.

In some embodiments, the recalibrating step 1115 may be used with the step of selecting a predetermined intensity 1150 for one or more lighting instruments. Continuing with the above example, where the step 1115 adjusts the intensity of the first and second lighting instrument to 25%, a third lighting instrument is added to the recording area. The third lighting instrument is set up to point directly at the background and is 10 feet away from the background. The third lighting instrument illuminates the background at 450 lumens. From the distance measurement (e.g., distance between lighting instruments, distance between lighting instrument and subject, distance between lighting instrument and background) and the location (e.g., lighting instrument is positioned toward the back or front of the recording area, behind or to a side of the subject, etc.) of the first and second lighting instruments, the software module can select a predetermined intensity that is appropriate for the third lighting instrument (e.g., 75% of 450 lumens). The software module can select a predetermined intensity for more than one lighting instrument. For example, if the optimal intensity for the second lighting instrument is not known yet, the software can select a predetermined intensity for the second lighting instrument and a predetermined intensity for the third lighting instrument. In some embodiments, after the distance measurement and location information are obtained and before the step 1115 assigns an optimal intensity to a particular lighting instrument, the software module can also select a preset (e.g., small office with background preset) that simultaneously assigns all the lighting instruments their optimal intensity such as 25% intensity for the first lighting instrument and 75% intensity for the second and third lighting instruments. Based on the above information, the term "adjustment" may include selecting an appropriate predetermined intensity. Further detail regarding the selection of a predetermined intensity is described below.

If the recalibrated intensity of each lighting instrument is suitable for the recording area, then the user accepts the setting and the method ends here 1130. No further adjustment is needed and the operational panel may be locked 1130 to prevent unauthorized or accidental access.

If further adjustment is required, the method may proceed to manually adjusting 1120 the intensity of each lighting instrument. The user can manually adjust the intensity of each of the three lighting instruments from the recalibrated intensity through the manual control command (e.g., 1020) which sends instructions to the microprocessor to execute the adjustment. The user may control the intensity as the recording activity progresses or if there is a need to modify the lighting. This feature allows the user to determine what he or she thinks is the best intensity for the subject and the recording area for any given situation. The manual adjustment may include changing the intensity of one or more lighting instruments in commensurate with or inversely proportional to the change to the intensity of the first lighting instrument. This feature may occur whenever there is a change to the intensity of the first lighting instrument. This feature may also be part of the recalibration step and be used to automatically adjust the intensity of the other two lighting instruments.

If the manually adjusted intensity is suitable for the recording area, then the user accepts the setting and the method ends here 1130. No further adjustment is needed and the operational panel may be locked 1130 to prevent unauthorized or accidental access.

The method may comprise of providing 1150 a plurality of predetermined intensities. Each of the intensities may pre-programmed and stored in the software module. Each of the intensities is designed for a specific environmental condition, effect, or activity (e.g., dark or bright room, small or large office size or more professional look, formal or information meeting, etc.). The software module can also adjust each of the pre-programmed intensities (or the selected pre-programmed intensity) if needed according to the lighting condition in the recording area. The software module can further create an intensity based on the lighting condition in the recording area without relying on any of the predetermined intensities. These predetermined intensities may be also known as scene settings which have predetermined intensities across all the lighting instruments. A predetermined intensity may be selected by the user through the predetermined intensity selection command at any time after the lighting system is setup. The command sends instructions to the microprocessor to execute the selection. For example, a predetermined intensity may be selected by the user after the recalibration step or the manual adjustment step. The user may also select a predetermined intensity to replace the recalibration step, the manual adjustment step, or both steps so the replaced step will not be performed. The user may also select a predetermined intensity at the end of all the steps as an additional option. The user may select through different predetermined intensities to determine which intensity is the optimal for the subject and the recording area. The predetermined intensity may also be automatically selected by the module based on its determination after the lighting instruments are activated and the light sources fade up to their initial intensity. In some embodiments, a predetermined intensity may be selected before the lighting instruments are activated and the light sources fade up. The light sources will then fade up to the predetermined intensity once the lighting instruments are activated or when the camera is turned on. The predetermined intensity may be an intensity for a lighting instrument or the overall intensity by all lighting instruments.

If a selected predetermined intensity is suitable for the recording area, then the user accepts the setting and the method ends here 1130. No further adjustment is needed and the operational panel may be locked 1130 to prevent unauthorized access and accidental access.

If none of the selected predetermined intensity is satisfactory, the user can select one of the predetermined intensities and proceed to the manual adjustment step again to further adjust the predetermined intensity of each lighting instrument. The resulting intensity based on this adjustment can be saved in the module or memory of the computer for future use. Adjustment made during the recalibration step and the manual adjustment step may also be saved for future use.

The method may also comprise changing 1155 the color temperature of one or more lighting instruments. Changing the color temperature allows the color of the lighting instrument to match to the ambient color of the recording area and the ambient color in the image or video image captured by the camera. The color temperature might also be changed simply to give the user's environment a different look. The color temperature may be automatically changed by the module based on the module's determination or manually changed by the user through the color temperature command which sends instructions to the microprocessor to execute the change. The color temperature may also be changed by the user applying a color filter or a color gel to the front of the lighting instrument and/or the barn door of the lighting instrument.

Although the performance of the calibrating step, the manual adjustment step, and the selecting a predetermined intensity step are described in a certain order, the commands in the operational panel may allow those steps to be performed independently of each other or in any order. For example, the manual adjustment step may be performed before the recalibrating step to manually set the intensity for each lighting instrument. For another example, the recalibration step may be performed after selecting a predetermined intensity. For yet another example, the manual adjustment step may be introduced in the activation step to override the default intensity and the intensity based on the measurements by the sensors and meter and to allow the user to set his or her own intensity from the beginning. The operation panel may lock after a period of inactivity to prevent unauthorized access and accidental access and the user may need to enter user name and access code to unlock the panel.

A predetermined intensity may be selected and adjusted by the software module according to one of the following methods. The methods are divided into two groups, with the first one tailored to a lighting system without a distance sensor and with the second one tailored to a lighting system employing a distance sensor. A lighting system without a distance sensor means that none of the lighting instruments and the central hub is installed with a distance sensor and that no other distance sensor is used in conjunction with the lighting system. A lighting system employing a distance sensor means that at least one of the lighting instruments and the central hub is installed with a distance sensor. Such a system may also refer to one that none of the lighting instruments and the central hub is installed with a distance sensor but a separate distance sensor is used in conjunction with the lighting system. The software module includes a database storing a plurality of predetermined intensities to be selected. The database may also be remote from the software module (e.g. on Internet) and be accessible by the software module.

The first group includes a method based on the settings of the camera (FIG. 12), a method based on a frame captured by the camera (FIG. 13), a method based on luminance calibration (FIG. 15), a method based on an ambient light meter, and a method based on a pulse reading. The camera discussed in the first and second group refers to the camera of the display on which the first lighting instrument is installed or the camera configured to capture a frame of the subject and provide the frame to the other party. A frame refers to a video frame or image.

Figure 12:
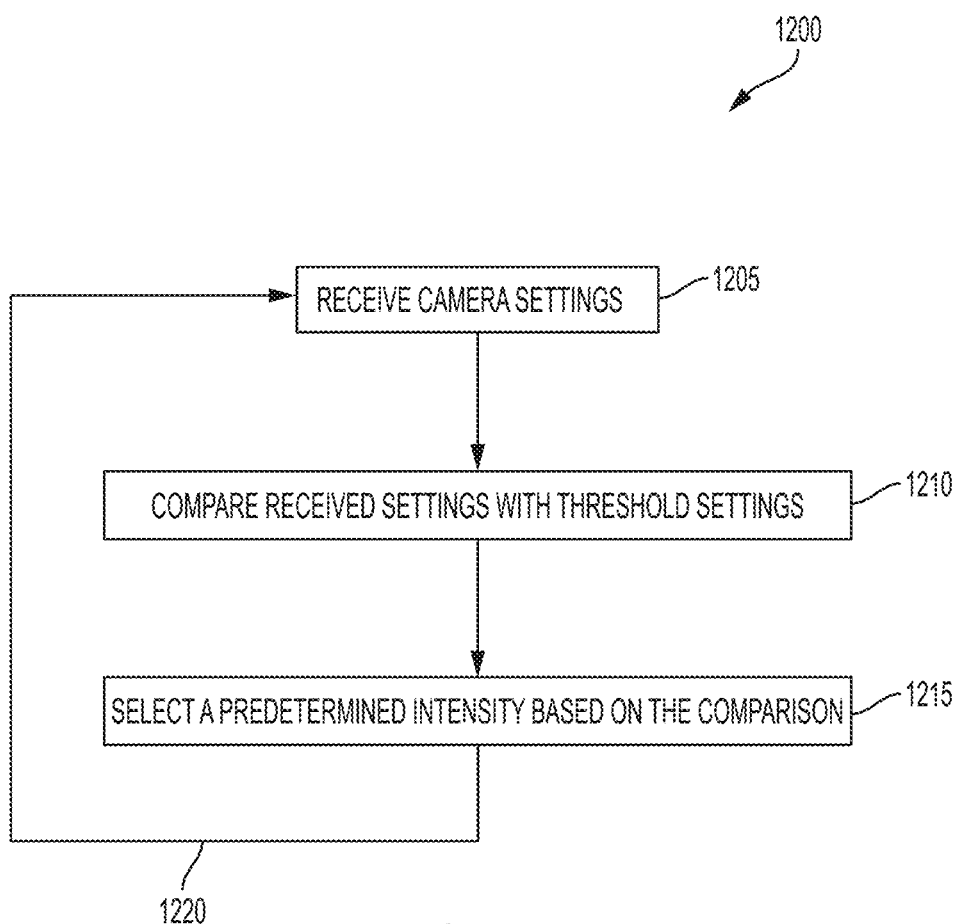
FIG. 12 depicts an illustrative method of selecting a predetermined intensity based on the settings of the camera in accordance with some embodiments of the present invention.

FIG. 12 depicts an illustrative method 1200 of selecting a predetermined intensity based on the settings of the camera in accordance with some embodiments of the present invention. The method 1200 includes the software module receiving settings from a camera indicative of light level in the recording area 1205, comparing the received settings to corresponding threshold settings 1210, and selecting a predetermined intensity from a plurality of predetermined intensities based on the comparison 1215. The settings may include the camera's aperture (f-stop), ISO (film speed), shutter speed, gain setting, and other setting indicative of light level in the recording area. The comparison step 1210 may determine that the received settings are larger or smaller than the corresponding threshold settings. Based on the result, the method 1200 selects a predetermined intensity that can change the light level associated with the received settings to match or to be comparable to the light level associated with the corresponding threshold settings. Once selected, the light intensity of the lighting instruments is adjusted to the selected predetermined intensity. The change may require a series of selections and the method 1200 may be repeated 1220 until the received settings match or are comparable to the corresponding threshold settings. If the received settings and the corresponding threshold settings are identical or similar enough, then the selection step stops or is not needed.

For example, when the lighting instruments and/or the central hub receive settings showing that the aperture of the camera has increased, that the ISO sensitivity of the camera has increased, that the shutter speed of the camera has slowed, that the gain of the camera has increased, or a combination thereof (which show a low light recording area), the software module selects a predetermined intensity that can increase or lower one or more of these settings so subsequent received settings can match the corresponding threshold settings. For instance, the threshold settings for the aperture, ISO sensitivity, shutter speed, and gain may be f/1.7, 400, 1/60 second and 0 db, respectively. The selection may be based on one or more of these threshold settings such as selecting a predetermined intensity associated with f/1.7, 400, 1/60 second, 0 db, or based on a combination thereof. The threshold settings may be set by the software module or the user. The threshold setting may be a threshold range instead of a specific number. The above concept also applies other light level in the recording area (e.g., a high light recording area) and can be modified according to the specific light level.

One or more of the lighting instruments and/or the central hub is configured to receive the settings. The settings are measurements obtained by the camera based on the light level in the recording area. The lighting instrument and/or the central hub may be configured to receive one or more of these settings at a frequency. For example, the lighting instruments and/or the central hub can be configured to receive the settings every time a frame is captured, every period of time (e.g., 30 seconds), or every several frames (e.g., 240 frames). The lighting instruments and/or the central hub receive the settings in real-time so that a predetermined intensity can be selected and produced in real-time. The lighting instruments and central hub includes a processor, sensor, transceiver, or other similar device configured to process the received settings into data that can used by the lighting instruments to adjust their light intensity and by the central hub to provide light intensity adjusting instructions to the lighting instruments. The camera includes components that perform the functions of the settings, that record measurements after performing the functions, and that provide the recorded measurements to the lighting instruments and/or central hub.

Figure 13:
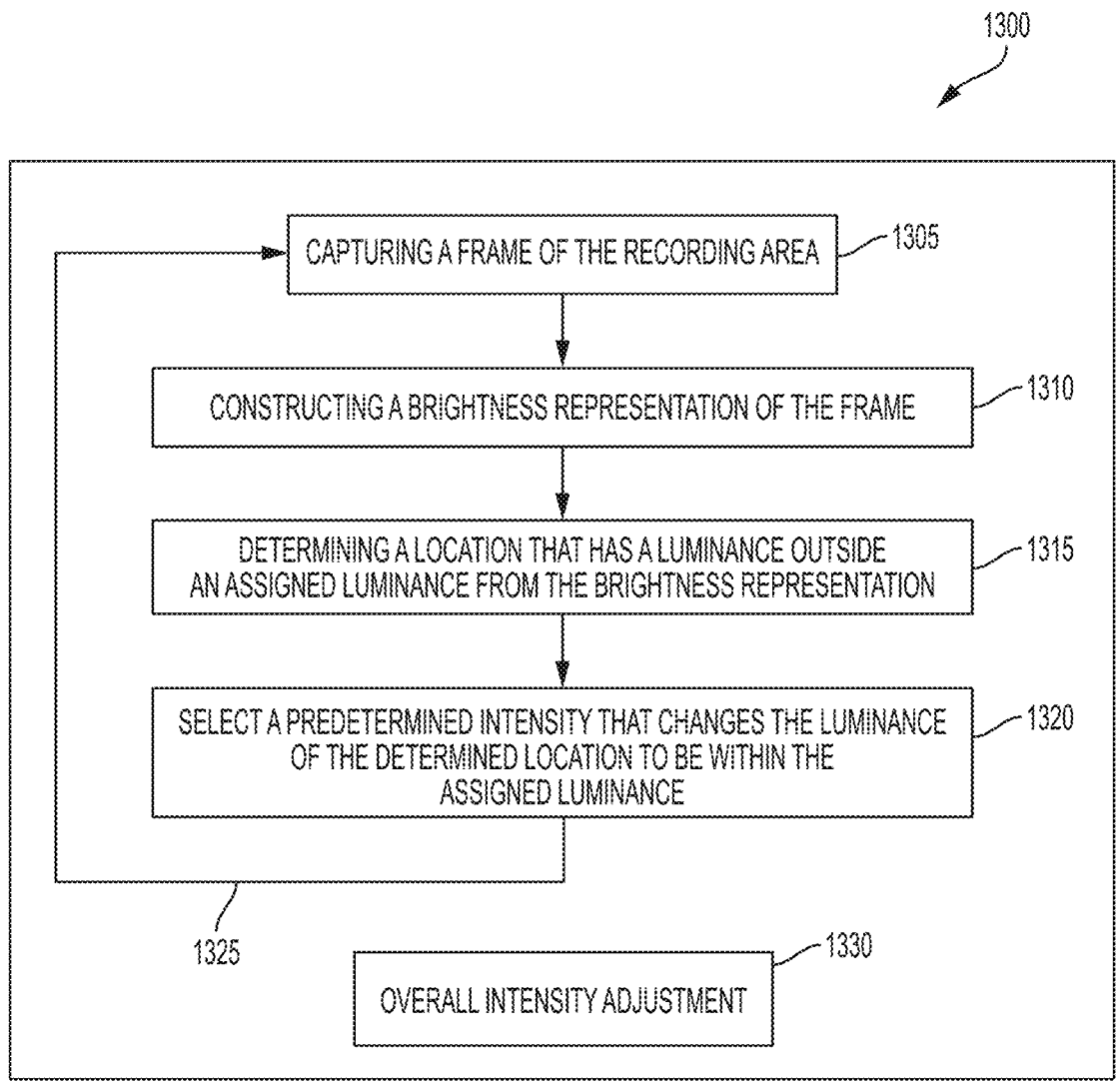
FIG. 13 depicts an illustrative method of selecting a predetermined intensity based on a frame captured by the camera in accordance with some embodiments of the present invention.
Figure 14:
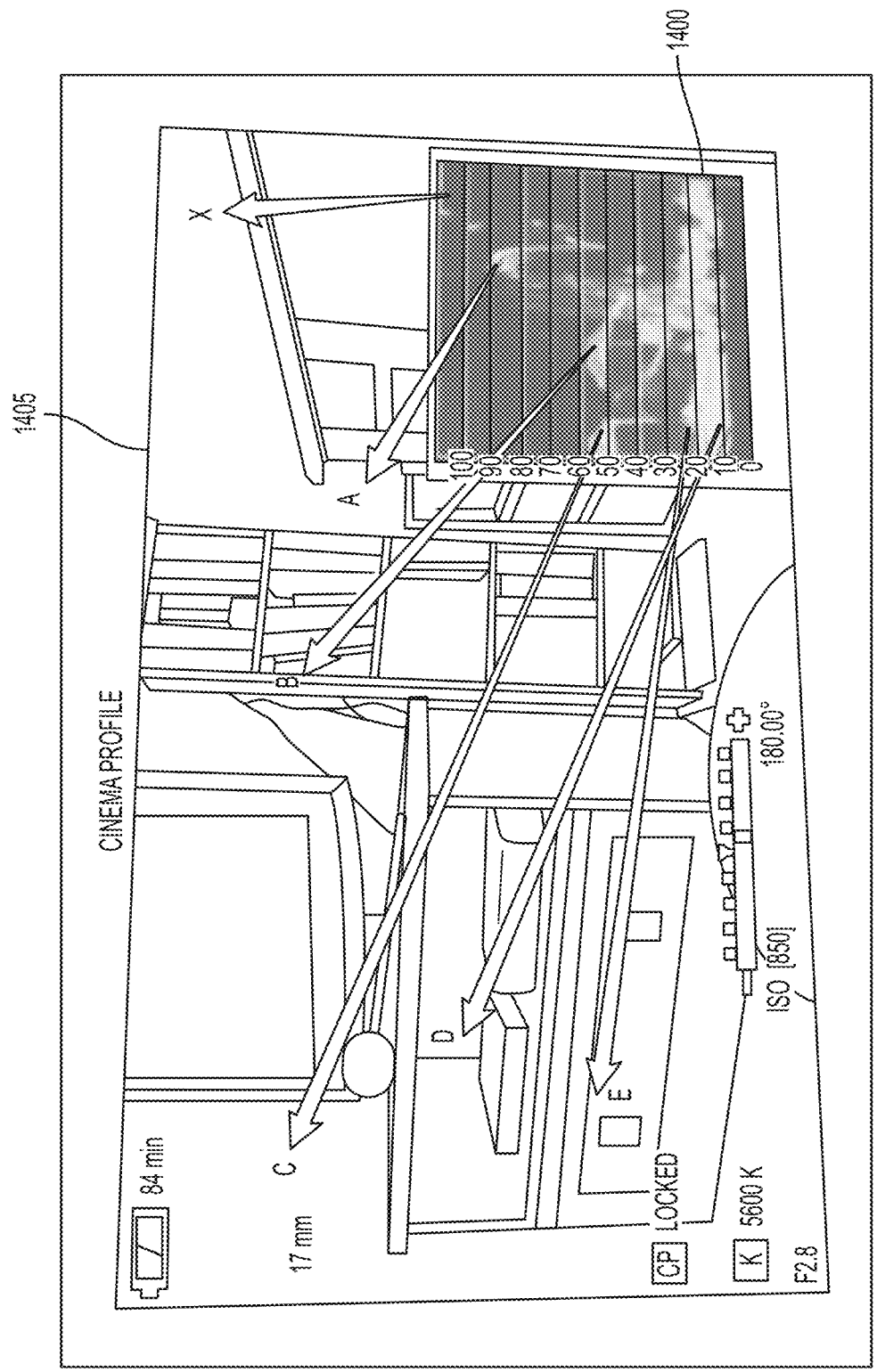
FIG. 14 depicts an illustrative brightness representation for a captured frame in accordance with some embodiments of the present invention.

FIG. 13 depicts an illustrative method 1300 of selecting a predetermined intensity based on a frame captured by the camera in accordance with some embodiments of the present invention. The method 1300 includes capturing a frame of the recording area 1305, constructing a brightness representation of the frame 1310, determining a location in the recording area that has a luminance outside an assigned luminance range from the brightness representation 1315, and selecting a predetermined intensity that changes the luminance of the determined location to be within the assigned luminance range 1320. The brightness representation can be a waveform, diagram, graph, table, image, or other form, and it contains only luminance information (e.g., without the subject and any other items and information) and provides luminance information across the entire frame (or for every area or point in the frame). FIG. 14 depicts an illustrative brightness representation 1400 for a captured frame 1405. The representation 1400 shows that the frame 1405 has a luminance of 90% or between 80 and 90% at location A, an luminance of 55% or between 50% and 60% at location B, an luminance of 55% or between 50% and 60% at location C, an luminance of 10% or between 10% and 20% at location D, and an luminance of 20% or between 10% and 20% at location E. The luminance of the other locations may also be obtained from the representation 1400. 0% and 100% of the luminance range may mean the highest and lowest luminance a frame should have in a studio quality video or image, and the frame or recording area may have areas with luminance outside the 0-100% range. For example, the representation 1400 may show that the frame 1405 has a luminance above 110% at location X (e.g., a luminance that is too bright or the location is blown out) that cannot be shown in the representation. In some embodiments, the software module can construct a representation larger than 100%. Since the luminance information provided by the representation 1400 also includes information on the amount of ambient light in the recording area (the selection step 1320 can also take this information into consideration), an ambient light sensor does not need to be utilized with the lighting system.

The assigned luminance range can be determined by the software module or the user for a focus area and have a luminance range between the 0% to 100% luminance. For instance, the assigned luminance range for the primary focus area may be between 75% and 100% luminance and the assigned luminance range for the secondary focus area (or the remaining areas) may be between 35% and 60% luminance. Additional assigned luminance can be configured for additional focus areas (e.g., tertiary focus area, quaternary focus area, etc.). In the determining step 1315, this step can also determine whether an area in the frame falls in the primary focus area, secondary focus area, or other focus area and the assigned luminance range that is associated with the determined area. In the selecting step 1320, the selected intensity would allow the determined area to have proper lighting such as rendering a dark area to be brighter, a bright area to be darker, a bright area to be brighter (because the area has insufficient brightness), or a dark area to be darker (because the area has insufficient darkness), and so forth. The method 1300 may be repeated 1325 until the luminance of the determined location fall within the assigned luminance range. The method 1300 may further include determining an overall intensity produced by the lighting instruments upon selecting a predetermined intensity and adjusting the determined overall intensity to further distinguish the primary focus area from other focus areas without compromising the luminance of the primary and/or other focus areas (overall intensity adjustment step 1330). For example, a focus area that is dark can be made darker as long as the detail features in that area can still be seen by the user or the party receiving the frame. Step 1330 can occur every time after the selection step 1320 or only once after steps 1305-1320 have been repeated 1325 until the recording area has a desired lighting. Although the method 1300 is discussed with respect to selecting a predetermined intensity, it may also be employed in any of the steps shown in FIG. 11.

The lighting instruments and/or the central hub can include RFID tags, Bluetooth Low Energy devices, or other devices configured to determine which direction each lighting instrument is pointed and which areas of the recording area/frame can be affected by which specific lighting instrument(s). For example, one of the lighting instruments may be set up and configured to illuminate only the background, and if the background appears too bright in the frame, the software module can determine which one of the lighting instruments is illuminating the background and instruct it to reduce to its intensity. Through these devices, the software module can determine either or both the location and light direction of each lighting instrument in relation to the axis or direction of the camera. These devices may be known as location sensors. RFID tags, Bluetooth Low Energy devices, and other similar devices that can ascertain location and distance between each instrument and are more easily implemented than distance sensors in that distance sensors must be configured to find an object (or surface), send a signal toward that object, and receive the signal bounced off the object. Infrared distance sensors and ultrasonic distance sensors are examples of distance sensors and they are configured to translate the speed of sound to distance.

In situations where the lighting instruments collectively illuminate the same area or are configured to illuminate in different angles but with partial luminance overlapping in an area, the software module can also determine which lighting instruments are illuminating that area and instruct them to change intensity. The software module can adjust one lighting instrument first and then the other or adjust all the lighting instruments simultaneously. When the lighting instruments collectively illuminate the same area, the software module can determine which instrument is illuminating with a stronger intensity and instruct that instrument to adjust its intensity so that the desired intensity can be obtained quicker. The software module can also determine which instrument is illuminating with a weaker intensity and instructed that instrument to adjust its intensity so that the intensity is not changed too abruptly. When the lighting instruments are configured to illuminate in different angles but with some luminance overlapping in an area, the software module can determine the amount or percentage of the total luminance of each instrument in that area and instruct the instrument with larger or smaller percentage to change intensity. For example, the software module may determine that some of the luminance from the second and third lighting instruments overlap in an area and that 20% of the total luminance of the second lighting instrument falls in that area and 50% of the total luminance of the third lighting instrument falls in that area. The software module can instruct the second (or third) lighting instrument to change intensity. The lighting instruments and/or the central hub can also include components mentioned in the description of FIG. 12 but are configured to process a frame captured by the camera.

Figure 15:
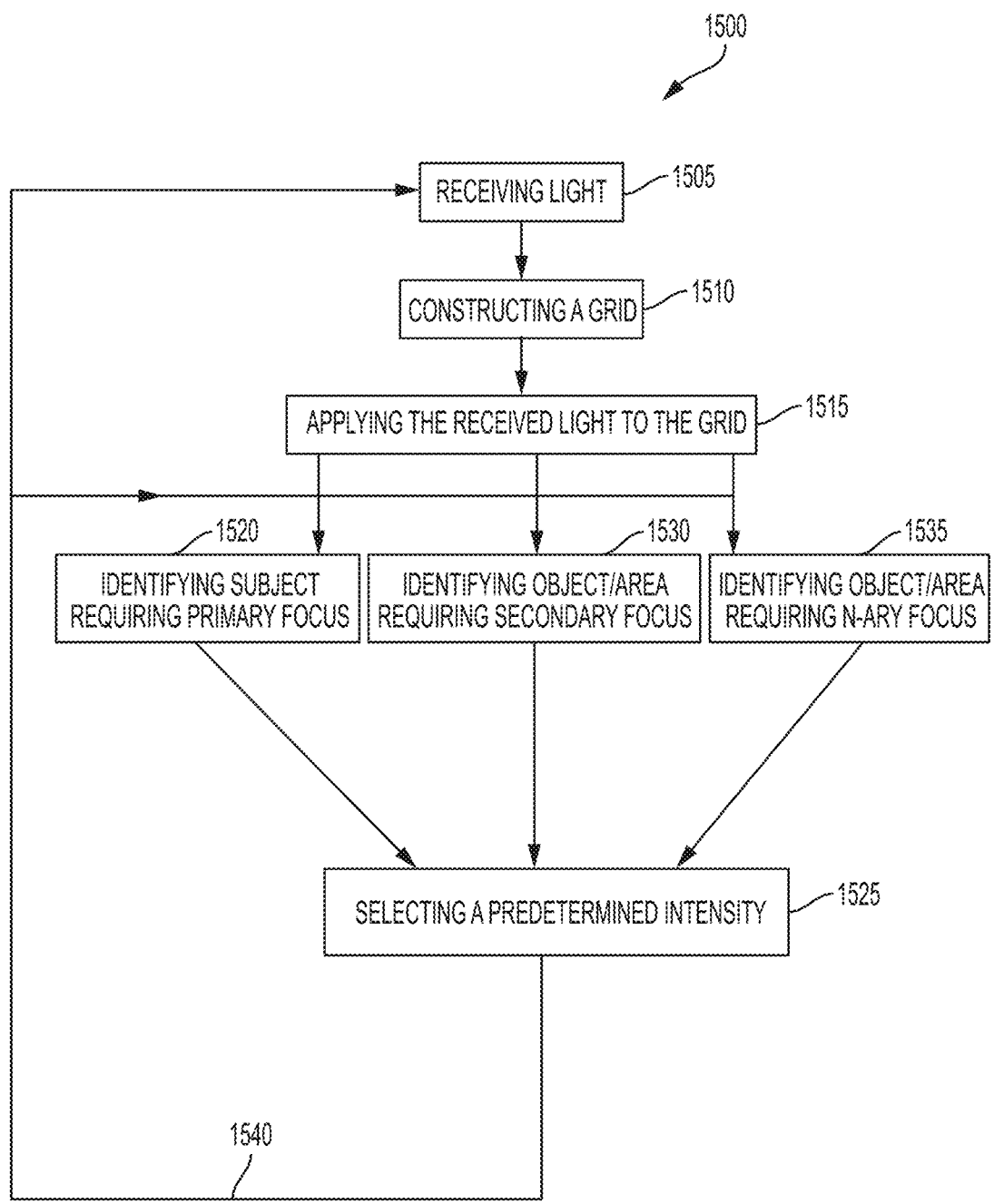
FIG. 15 depicts an illustrative method of selecting a predetermined intensity based on luminance calibration in accordance with some embodiments of the present invention.

FIG. 15 depicts an illustrative method 1500 of selecting a predetermined intensity based on luminance calibration in accordance with some embodiments of the present invention. The method 1500 includes receiving light from the recording area 1505, constructing a grid with lines representing light absorbing surfaces (or light reflective surfaces) and spaces between the lines representing transparent surfaces 1510, applying the received light to the grid 1515, identifying subject requiring a primary focus 1520, and selecting a predetermined intensity 1525.

The method 1500 may receive the light of the recording area from a captured frame, a light meter, other source, or a combination thereof. Regardless of the manner in which the light is obtained, the received light includes light information for the entire frame or the entire area captured by the camera. The amount of light at any location in the frame or area can be obtained from this information. The light information may be provided through the representation discussed in the description of FIG. 14. After constructing the grid, the method 1500 applies the received light to the grid to obtain modified light information. The modified light information includes luminance measurement for each space or square in the grid. Before, after, or simultaneously with step 1505, 1510, or 1515, the method 1500 identifies the subject that requires a primary focus 1520. The method 1500 may identify the subject from the same frame from which the light information is obtained or a different frame. The method 1500 may also identify the subject without actually capturing a frame as long as the subject is in the view of the camera. The software module includes algorithms to identify individual(s) as the subject by reading and analyzing the silhouette of the individual(s). From reading and analyzing the silhouette of an entity, the software module can determine whether the silhouette corresponds to the silhouette of a human head and shoulders. If the answer is yes, then the entity is identified as the subject. The software module may also include other algorithms to identify other entities (e.g., animals, objects, etc.) as the subject.

Figure 16:
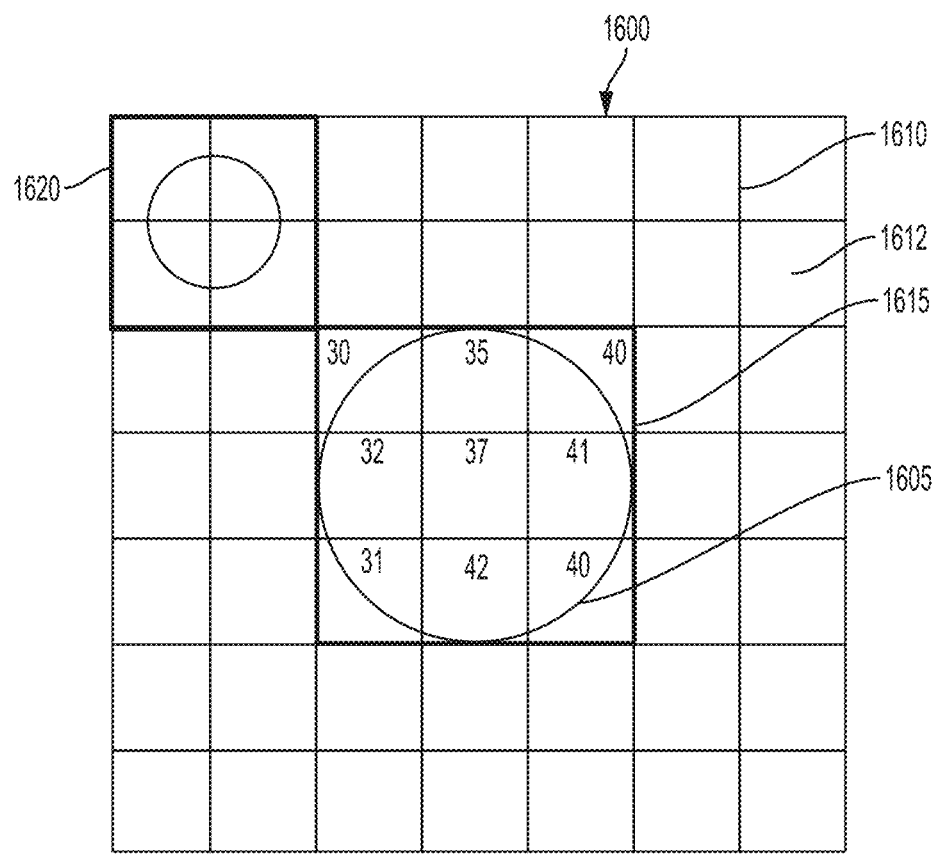
FIG. 16 depicts an illustrative grid showing the identified subject in accordance with some embodiments of the present invention.

Once the subject is identified, the method 1500 determines the location in the brightness representation where the subject is located and obtains luminance measurement of the location. The location includes a plurality of spaces given the format of the grid. Therefore, the method 1500 obtains luminance measurement of the location by obtaining luminance measurement of each space in the location and calculating an average luminance from all the luminance measurements obtained from all the spaces. As discussed earlier, the software module or user can assign a luminance range for a focus area such as a primary focus area. Whether the method 1500 selects a predetermined intensity depends on if the average luminance is outside the assigned luminance range for the primary focus area. If the average luminance is outside the assigned luminance range, then the method 1500 selects a predetermined intensity that brings the average luminance within the assigned luminance range. FIG. 16 depicts an illustrative grid 1600 showing the identified subject 1605. 1610 represents grid lines and 1612 represents the spaces between the grid lines. The grid 1600 may be constructed on and the subject 1605 may be identified from the same frame 1600. In some embodiments, the subject 1605 may be identified from a different source or frame and the software module may find the location of the subject in the grid and display the subject in that location. In FIG. 16, the subject 1605 is found to be in location 1615 that includes the center nine squares. The luminance measurement for each square is 30, 35, 40, 32, 37, 41, 31, 42, and 40, and the average luminance of all the squares is about 36. If the assigned luminance range is between 75% and 100%, then the method 1500 selects a predetermined intensity that can bring the average luminance to be within 75% and 100%. The method 1500 (and the method 1300) may include a verification step to check if the selected predetermined intensity brings the average luminance within the assigned luminance range and repeats the method 1500 until a selected predetermined intensity does. The verification step may include additional light measurements from the recording area or capturing additional frames subsequent to the selection step 1525 to confirm. If the average luminance is within the assigned luminance range, then no selection is made by the method 1500.

For any area other than the primary focus area, the method 1500 also performs similar operations. Once the location where the subject is located is determined, the method 1500 can determine another location in the brightness representation to be the secondary focus area 1530. The other location (1620, FIG. 16) also includes a plurality of spaces. The method 1500 obtains luminance measurements of those spaces and calculates an average luminance from those measurements. As discussed earlier, the software module or user can assign a luminance range for a focus area such as a secondary focus area. Whether the method 1500 selects a predetermined intensity for the secondary focus area depends on if the average luminance is outside the assigned luminance range for the secondary focus area. If the average luminance is outside the assigned luminance range, then the method 1500 selects a predetermined intensity that brings the average luminance within the assigned luminance range 1525. If the average luminance is within the assigned luminance range, then no selection is made. The method 1500 (and the method 1300) may also include the verification step discussed above for the secondary focus area.

The method 1500 may also be configured to select a predetermined intensity for additional focus areas 1535, 1525 (e.g., tertiary focus area, quaternary focus area, etc.). The software module can be programmed with assigned luminance range for more than two focus areas to be used by the method 1500. Such information may also be obtained by the software module through Internet or provided by the user to the software module. The software module includes algorithms for determining additional focus areas or distinguishing each focus area. Preferably, the steps related to the subject or primary focus area take precedence over the steps related to other focus areas and should perform before the latter steps. However, in some embodiments, it is possible that the steps related to the other focus areas are performed first. In general, the predetermined intensity selected for a focus area should not comprise the predetermined intensity selected for another focus area. In some situations, the predetermined intensity selected for a focus area may bring the luminance of another focus area out of that area's assigned luminance range. In those cases, the method 1500 is repeated until the average luminance of all the focus areas are within their respective assigned luminance range.

Steps 1520, 1530, 1535 can perform in one single step or different steps. Single step means that the operation of each step 1520, 1530, 1535 is completed before the method 1500 proceeds to the selecting step 1525. The operation of each step 1520, 1530, 1535 may occur simultaneously or at different times between the applying step 1515 and the selecting step 1525. Different steps mean that once an identifying step is performed for a focus area (e.g., 1520), the method 1500 proceeds to the selecting step 1525 before another identifying step (e.g., 1530) is performed. When the selecting step 1525 for the focus area is complete (e.g., primary focus area), the method 1500 proceeds to another identifying step 1530 and then the selecting step 1525 that operates based on the identifying step 1530. Therefore, the selecting step 1525 may also perform in one single step (e.g., is executed after all the identifying steps are performed and selects a predetermined intensity that satisfies all the focus areas) or different steps (e.g., is executed for each identifying step and selects a predetermined intensity that satisfies the focus area of that identifying step).

In some embodiments, the grid constructing step 1510 may be carried out by physically directing the light in the recording area to the camera in a manner such that the directed light is recognized in the form of a grid by the software module. The software module and lighting system include algorithms and hardware that recognize each space created in the grid and determine the luminance of each space. Such form of light may be produced by placing an apparatus resembling a grid on the subject and/or in front of the camera. A luminance reading graph paper is an exemplary apparatus. A luminance reading graph paper is a piece of transparent paper (e.g., 8.5 in ×11 in) with grid lines made of lighting absorbing or reflecting surfaces such as neural grey or aluminum. In some embodiments, such directed light or apparatus is not required. The software module and lighting system may include algorithms and hardware that can construct such a grid in the brightness representation or divide the brightness representation into a plurality of spaces according to a grid. The lighting instruments and/or the central hub include similar hardware discussed in the description of FIG. 13 to perform the above steps. A RFID tag, Bluetooth Low Energy device, or other location sensor can be provided on the furthest wall or object in order to help the software module determining the depth of the recording area for the purposes of determining intensities for lighting instruments pointed in the direction of the background.

In the method based on an ambient light meter, an ambient light meter is installed in one or more the lighting instruments or the central hub. The method selects a predetermined intensity based on the reading of the ambient light meter. The reading is communicated to the lighting instruments and/or the central through a wired or wireless connection discussed in this disclosure. The lighting instruments and/or the central hub also include similar hardware discussed in the description of FIG. 13 to receive, transmit, and process this information. The reading can trigger the method to make assumption regarding the color temperature of each lighting instrument, the distance between lighting instruments, the distance between a lighting instrument and the subject, the light direction of each lighting instrument, or a combination thereof. From the reading and the assumptions, the method can select a predetermined intensity. In some embodiments, the assumptions can be made independent of the reading and the method can select a predetermined intensity based on the reading and the independently determined assumptions. In some embodiments, the method can select a predetermined intensity based on the reading alone without making any assumption. In some embodiments, the ambient light meter is installed in the fob described below.

In the method based on a pulse reading, a pulse reading device is installed in the first lighting instrument. The device is configured to measure brightness level in the recording area, measure the size of the recording area, or a combination thereof. The device can perform such measuring through a sonic, infrared, laser, radio frequency, Bluetooth, or other form of wireless reading. From the measurement(s), the method can select a predetermined intensity accordingly. In one embodiment, the device is a 360-degree camera that is configured to operate similar to the camera discussed in the method 1300 and 1500. The 360-degree camera has the added advantage of being used for video calls and allowing people anywhere in the recording area to be filmed in the call (e.g., people sitting on the opposite sides of a desk or everyone sitting in a circular desk.) When a 360-degree camera is adopted in the lighting system, the first lighting instrument is configured to illuminate every subject in the recording area simultaneously. When people are sitting on opposite sides of the desk, the first lighting instrument may include a first light source configured to illuminate one side of the desk and a second light source configured to illuminate another side of the desk that is parallel to the one side. When people are sitting in a circular desk, the first lighting instrument may include one or more light sources configured to illuminate in a 360-degree fashion. The measurement of the size of the recording area may be obtained by the device alone or through the position of the lighting instruments in the recording area.

Figure 18:
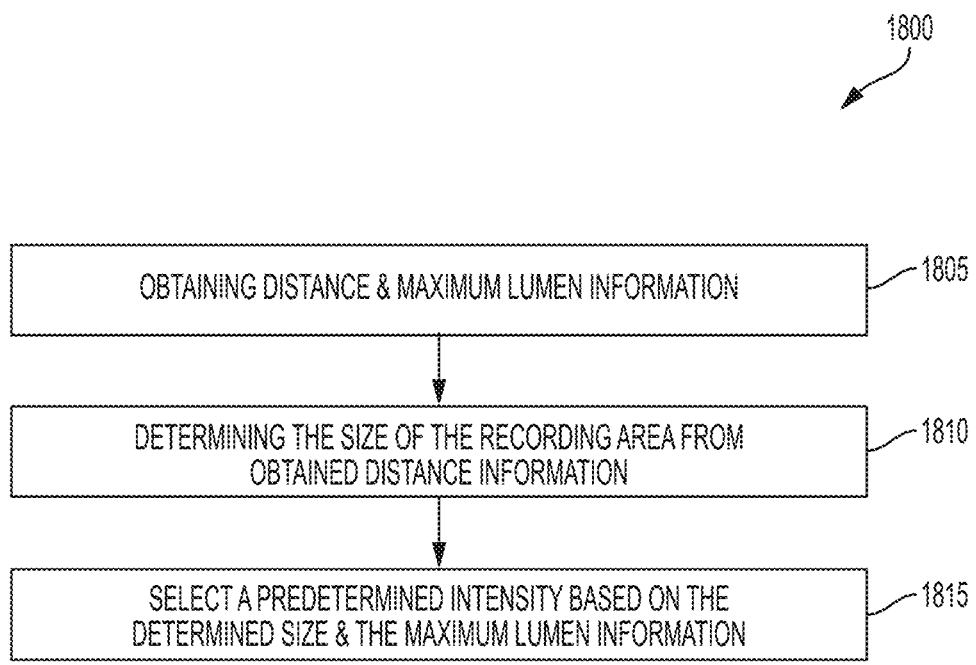
FIG. 18 depicts an illustrative method of selecting a predetermined intensity based on total area extrapolation in accordance with some embodiments of the present invention.

The second group includes a method based on measurements from a fob (FIG. 17) and a method based on extrapolated total area (FIG. 18). FIG. 17 depicts an illustrative method 1700 of selecting a predetermined intensity based on measurements from a fob in accordance with some embodiments of the present invention. The method 1700 involves a handheld device 1780 including an ambient light sensor, a distance sensor, a color temperature sensor, a location sensor, or a combination thereof. The device 1780 may be known as fob. The ambient light sensor may be configured to measure the amount of ambient light in the recording area including both artificial and natural light. The color temperature sensor may be configured to measure the color temperature of the ambient light. The location sensor may be configured to measure the orientation of a lighting instrument, the light illuminating axis of a lighting instrument, or a combination thereof. The fob or incorporated sensors transmit a signal to the lighting instrument to ascertain the distance and direction.

The method 1700 includes providing the device on the subject or near the subject 1705, activating the device to communicate with one or more of lighting instruments 1710, conducting a measurement with one or more of lighting instruments 1715, and selecting a predetermined intensity based on the conducted measurement 1720. Once the device is activated (e.g., by pressing the "read" button), the device conducts a measurement with lighting instruments to obtain information such as the distance between the lighting instrument and the device, the location of the lighting instrument, the color temperature of the lighting instrument (if the lighting instrument is installed with a color temperature sensor), or a combination thereof depending what sensors are incorporated into the fob. The device can conduct additional measurements depending what sensors are in the device. The measurement with one lighting instrument is conducted independent of other measurements conducted with other lighting instrument. These measurements may occur simultaneously or at different times. From the measurements, the method 1700 can select a predetermined intensity 1720 for each lighting instrument or a setting that assigns each lighting instrument appropriate lighting. The fob could be used to centralize all the measurements directly to itself without going through the necessary calculations discussed in the recalibration step in relation to the first lighting instrument. If the recalibration step already determines the optimal lighting or selects a predetermined intensity or setting, then the method 1700 or the fob can be modified to measure ambient light or obtain other information so the method 1700 can further adjust the intensity determined in that step based on the additional information. The lighting instruments and/or the central hub also include similar hardware discussed in the description of FIG. 13 to receive, transmit, and process the relevant information and may communicate with the fob through a wired or wireless connection discussed in this disclosure.

The fob may be configured to measure different levels of ambient light such as on a scale of 1 to 10. 1 may mean no lighting, 2 may mean extremely low lighting, 3 may mean low lighting, 4 may mean moderately low lighting, 5 may mean moderate lighting, 6 may mean moderately high lighting, 7 may mean acceptable lighting, 8 may mean good lighting, 9 may mean excellent lighting, and 10 may mean perfect lighting. When the fob receives a reading of 3, the software module may select a corresponding predetermined intensity, such as one that instructs the first lighting instrument to illuminate at 25% and the second and third lighting instrument to illuminate at 70% of their maximum lumens.

FIG. 18 depicts an illustrative method 1800 of selecting a predetermined intensity based on total area extrapolation in accordance with some embodiments of the present invention. The method 1800 includes obtaining distance information and maximum lumen information from lighting instruments 1805, determining (or extrapolating) the size of the recording area from the obtained distance information 1810, and selecting a predetermined intensity based on the obtained maximum lumen information and the determined sized 1815. The distance information may include the distance between two lighting instrument, the distance between a lighting instrument and an object or background, the distance between the subject and a lighting instrument, or a combination thereof. The size may refer to the area covered by the lighting instruments (e.g., triangular area) or the determined by the lighting instruments (e.g., can detect where the walls are and determine the size of the square, rectangle or round-shaped recording area). The maximum lumen information includes the maximum lumen of each lighting instrument, the maximum lumen that can be output by all the lighting instruments, or a combination thereof. From the determined size and maximum lumen information, the software module can determine whether the maximum lumen output by all the lighting instruments is sufficient to illuminate the recording area. If the illumination is insufficient or substantially brighter, then the software module can recalculate the intensity for one or more lighting instruments using a method in the first or second group to reach the sufficient or acceptable illumination. In some embodiments, the software module can select a particular setting based the determined area without the recalculation.

For example, the lighting system includes three lighting instruments and each lighting instrument has a maximum lumen of 450. The first lighting instrument may start with a 25% intensity (or 112.5 lumens) of its maximum lumen and the second and third lighting instrument may start with a 40% intensity (or 180 lumens) of their respective maximum lumen, whether the initial intensities are determined by default configuration or through a method discussed in this disclosure. From this information, the method 1800 determines that the maximum lumen output by all the lighting instruments is 472.5 lumens. The method 1800 also determines that the size of the recording area to be 100 square feet. The size can be extrapolated by base times height of the triangle established by three lighting instruments but without dividing by two. This extrapolation provides a rough estimate of the square-shaped recording area. The method 1800 then calculates that the 472.5 total lumens is not enough to adequately illuminate the 100 square foot space and can recalculate the intensity for one or more lighting instruments using a method in the first or second group to reach the sufficient or acceptable illumination or select a particular setting that can adequately illuminate the space. If the determined area is 50 square foot, then the initial intensities may be sufficient and the step of selecting a predetermined intensity may not be necessary.

When the method 1800 determines that the recording area or the scene appears in the view of the camera to be larger than 400 square foot, the method 1800 adjusts the intensity of the second and third lighting instruments to be closer to or at 100% or selects a setting that changes the intensity of those lighting instrument to be closer to or at 100%. If the second and third lighting instruments are configured to point at a background or object then the method 1800 may set the intensities of those lighting instruments independently or select a custom setting.

Rather than determining the size of the recording area through the distance information from the lighting instruments, the size of the recording area can also be determined through a device configured to measure the size of the space or room in which the recording area is located. The device can be a device separate from the lighting system and be used in conjunction with the lighting system or embedded in a lighting instrument or central hub. The device can be an infrared distance meter, ultrasonic distance meter, or other device that is configured to translate the speed of sound to distance. Once the size of the room is determined, the method 1800 can determine the position of the first lighting instrument in relation to the room size, detect that the subject is in front of the first lighting instrument, determine that the area in front of the first lighting instrument is the recording area, and calculates the size of that area. The resulting area is the area that the user wants to professionally illuminate and the method 1800 can select a predetermined intensity accordingly.

For example, the infrared distance meter determines that the room size is 12 feet by 12 feet or 144 square feet and the first lighting instrument is determined by the software module to be 6 feet from a wall and pointed at the wall, the recording area is estimated to be 6 feet by 12 feet or 72 square feet. The method 1800 may select a 25% intensity for the front lighting instrument and a 65% intensity for the other two lighting instruments based on that area.

The lighting instruments and/or the central hub for implementing the method 1800 also include similar hardware discussed in the description of FIG. 13 to receive, transmit, and process the relevant information and may communicate with each other through a wired or wireless connection discussed in this disclosure.

The intensity established through a method in the first group or second group can also be cross-referenced with the method 1800 to make further adjustments.

For any method in the two groups, each method can make assumption regarding the color temperature of each lighting instrument, the distance between lighting instruments, the distance between a lighting instrument and the subject, the light direction of each lighting instrument, or a combination thereof. With the assumptions and the measurements obtained in each method, each method can select a predetermined intensity accordingly. In some embodiments, the assumptions can be made independent of the measurements obtained in that method and that method can select a predetermined intensity based on the obtained measurements and the independently determined assumptions. In some embodiments, each method can select a predetermined intensity based on the obtained measurements only, without making any assumption.

Each of the methods in the first or second group can be executed independently or in conjunction with another method in the first or second group. When the methods perform in conjunction, their operation may depend on whether distance sensors are used by the lighting system.

When distance sensors are used by the lighting system, the software module detects their presence and may start with executing the method 1700 (or the recalibration step) to determine each lighting instrument's distance from the subject. A predetermined intensity is selected for each lighting instrument based on the distance the maximum lumen of each lighting instrument. Next, the software module may check the readings on the camera in the method 1200 to see if the camera is providing too little or too much lighting compensating measures and adjusts instrument intensity based on the steps outlined in the method 1200 if needed. Last, the software module may analyze the luminance level by executing the method 1300, 1400, or 1700 to see if the primary focus area and other areas are within assigned ranges. The intensity of the lighting instruments are then further adjusted accordingly if necessary.

In another example when distance sensors are used by the lighting system, the software module detects their presence and may start with executing the method 1800 to select a predetermined intensity. Next, the software module may check the readings on the camera in the method 1200 to see if the camera is providing too little or too much lighting compensating measures and adjusts instrument intensity based on the steps outlined in the method 1200 if needed. Last, the software module may analyze the luminance level by executing the method 1300, 1400, or 1700 to see if the primary focus area and other areas are within assigned ranges. The intensity of the lighting instruments are then further adjusted accordingly if necessary.

When distance sensors are not used by the lighting system, the software module may start with executing the method 1300, 1400, or 1700 to see if the primary focus area and other areas are within assigned ranges. The intensity of the lighting instruments are then adjusted accordingly. Next, the software module may check the reading on the camera in the method 1200 to see if the camera is providing too much or too little light compensating measures and adjusts instrument intensity based on the steps outlined in the method 1200 if needed.

The lighting system implementing any method in the two groups can also employ an ambient light sensor, location sensor, direction sensor, color temperature sensor, and/or distance sensor to better refine the predetermined intensity selection process if any of those sensors are not already included. Through distance, location and direction sensors, each lighting instrument will know whether it needs to determine the distance to the subject in order to adjust intensity or whether a lighting instrument is actually pointed at another object such as the background and will adjust intensity accordingly.

In some embodiments, each lighting instrument is equipped with LED array light casting that allows each instrument to achieve a specific color or color temperature within a wide range of colors and color temperatures. For example, each instrument can be set at a color temperature between 3200 Kelvin and 6200 kelvin. The color temperature sensor can take a read of the color temperature within the subject's area and allows the software module to select the color temperature of the instruments based on this reading.

In some embodiments, the first lighting instrument can be attached to the display by miniature suction cups, removable adhesive, or any other type of attachment. In this way, when the first lighting instrument is used on the display of a laptop computer, the user can open and close the laptop computer without having to remove, retract, and deploy the instrument each time the user wants to shut down and transport his or her laptop computer to another location.

The selected predetermined intensity may instruct only one particular lighting instrument to change intensity or more than one lighting instrument to change intensity.

Although the above steps are directed to intensity change, they also apply to light angle change or both intensity change and light angle change. Although the above steps involve adjustment based on the distance between the subject and the lighting instrument, adjustment may also consider the amount of ambient light in the recording area, the location of the subject in the recording area, or a combination thereof.

During any of the steps in the methods described in this disclosure, the operation and other features of the camera may be set to manual or automatic, which determines whether the camera should automatically adjust gain or ISO, open aperture, slow shutter, change exposure, produce strobe light, or perform other function when the light intensity is changed or when the lighting system is determining the appropriate light intensity for the subject. In the manual mode, the ambient light in the recording area is insufficient to record a studio quality image. In the automatic mode, the automatic adjustment may improve the image quality but the quality is short of that recorded in a light studio. Image quality or light quality below that produced by a light studio or the present system and method is referred to as raw quality. The image produced with such quality is referred to as raw image. It is the use of the present system and/or method that transforms a raw image (or raw quality lighting) into a studio quality image (or studio quality lighting).

Also during any of the steps in the methods described in this disclosure, the operation of the display on which the first lighting instrument is installed, such as intensity or brightness emitted by the display, is not influenced, controlled, or adjusted by the software module. The display is not in electrical communication with the lighting system or the central hub, either directly or indirectly (e.g., via the computer), to receive instructions or measurements from the lighting system or the central hub or to transmit instructions or measurements to the lighting system or the central hub. The brightness of display maintains the same throughout the steps unless the user adjusts its brightness through an instrument (e.g., physical or digital button) provided by the display.

The module also has the ability to connect several lighting systems together or to connect additional lighting instruments to the existing lighting instruments so the user can operate several systems or instruments at the same time.

It would be understood that the module is not limited to operating the lighting system presented in this disclosure. The method may also be used to operate other lighting systems.

The module works with consumer and enterprise video platforms such as WebEx, HighFive, BlueJeans, Videxio, Skype, Facetime, Facebook and other video conferencing applications.

Embodiments of the present invention may also be configured to be a base station or 3-point desk lamp for the user. The lighting instruments can be adjusted to suit the environment in which the user is located even if he or she is not recording an image or video. In this situation, the lighting system may further include a housing to store the first lighting instrument. When the lighting system is not in use, the first lighting instrument may be folded and be stored in the housing in its retracted position. The second and third lighting instrument may be set up at any location for purposes other than recording image or video. The module may be implemented in either the microprocessor or the central hub, and the microprocessor or the central hub and the lighting instruments may be connected in the manners discussed above.

It is understood from the above description that the functionality and features of the systems, devices, or methods of embodiments of the present invention include generating and sending signals to accomplish the actions.

The term "the lighting instrument" can be any one of the lightings instruments in the lighting system unless otherwise noted.

The term "user" refers to the person who operates the lighting system and the module, and the term "subject" refers to an item or person appearing before the camera or being illuminated by the lighting system. The user and the subject may be the same person or two different individuals.

The term "viewer" refers to the person receiving the recording or transmission, the person appearing on the display, the user or subject, or all of the above.

The term "recording area" refers to the area in which the subject is positioned or being illuminated by the lighting system, including the background (area behind the subject including a wall, structure, or drape). The recording area may correspond to the view of the camera. The recording area may also include area outside the view of the camera such as where the lighting instruments are set up.

The term "real time" means that a device (or system) performs an operation as it receives one or more inputs (e.g., a frame or an instruction from another device). The device operates such that the user of the device perceives the output (e.g., the adjusted light intensity or the frame with adjusted light intensity) to be produced instantaneously (e.g., without appreciable delay perceived by the user) when the device receives an input.

The words "may" and "can" are used in the present description to indicate that this is one embodiment but the description should not be understood to be the only embodiment.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the system or method illustratively described herein provides computer-implemented functionality that automatically performs a step unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

The methods in accordance with the present invention (and the associated claims) are more than just a set of computer instructions applying an abstract idea or routine human task. The present invention improves the current technology in providing lighting to a recording area or a subject in the recording area. The drawbacks with the current technology are many. Some methods require considering and changing the brightness of the computer monitor to achieve the optimal lighting. Some methods necessitate the use of numerous optical elements and involve complicated structures, (e.g., built-in reflectors, color correction filters, diffuser lens plates, and their position with respect each other in an enclosure) to produce the ideal lighting. Some methods cause significant eye strain or user discomfort in attempts to adjust light intensity. Some methods in the current technology require capturing an image of the subject first before the method can determine how the lighting should be controlled. Such methods, however, do not capture an image with only luminance information and do not use the captured image to determine an average luminance for a focus area, compare that luminance with an assigned luminance range for that area, and select a predetermined light intensity based on the comparison result. While the equipment used by professional video organizations can provide the appropriate lighting, they are generally expensive, inconvenient, and not available many users. The systems, devices, and methods described in accordance with the present invention solve the above shortcomings and are improved over what is currently known in the art. There are also other deficiencies that can be remedied based on illustrative descriptions provided herein.

The method in accordance with the present invention (and the associated claims) also improves the functioning of the computer itself. The module in which the method is implemented contains rules specifically designed to produce optimal and realistic lighting in an image or video recording without requiring manual intervention. Moreover, it is the incorporation of the module, not the user of the computer, that improves the existing technological processes.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications are evident without significantly departing from the spirit of the invention, and the scope of protection is only limited by the scope of the accompanying claims.

The invention claimed is:

1. A lighting system for illuminating a recording area comprising:
   a lighting instrument including a light source;
   a microprocessor; and
   memory storing data comprising a plurality of luminance ranges and a plurality of predetermined light intensities for different focus areas in a frame received from a camera;
   wherein the microprocessor is configured to:
      communicate with the lighting instrument, the memory, and the camera;
      receive a frame of the recording area from the camera;
      select a focus area in the frame;
      determine a luminance range of the focus area using one of the luminance ranges stored in the memory;
      construct a brightness representation of the frame;
      determine a location in the brightness representation that corresponds to the focus area;
      determine luminance of the determined location;
      compare the determined luminance of the determined location with the determined luminance range of the focus area; and
      adjust light intensity of the light source to one of the plurality of predetermined light intensities stored in the memory.

2. The system of claim 1, wherein the brightness representation is a grid and the grid includes a plurality of grid lines defining a plurality of spaces.

3. The system of claim 2, wherein determining a location in the brightness representation that corresponds to the focus area includes determining at least one space in the plurality of spaces that correspond to the focus area.

4. The system of claim 3, wherein the microprocessor is further configured to determine luminance of the determined at least one space.

5. The system of claim 4, wherein the determined at least one space includes more than one space, and wherein the microprocessor is further configured to calculate an average luminance from a sum of the determined luminance of each determined space.

6. The system of claim 5, wherein the microprocessor is further configured to determine whether the calculated average luminance is outside the determined luminance range.

7. The system of claim 6, wherein adjusting light intensity of the light source to the one of the plurality of predetermined light intensities stored in the memory is executed in response to determining that the calculated average luminance is outside the determined luminance range.

8. The system of claim 1, wherein the microprocessor is further configured to determine that the determined luminance is outside the determined luminance range.

9. The system of claim 8, wherein adjusting light intensity of the light source to the one of the plurality of predetermined light intensities stored in the memory is executed in response to determining that the determined luminance is outside the determined luminance range.

10. The system of claim 1, wherein the lighting system further includes a distance sensor configured to measure distance between the recording area and the distance sensor, and wherein the microprocessor is further configured to communicate with the distance sensor.

11. The system of claim 10, wherein the microprocessor is further configured to:
activate the light source to emit light at an intensity on the recording area without considering a distance measurement from the distance sensor;
receive a distance measurement from the distance sensor to a subject in the recording area; and
adjust the emitted light intensity by the light source to another light intensity based on the distance measurement from the distance sensor to the subject in the recording area.

12. A method for operating a lighting system comprising:
storing, in memory, data comprising a plurality of luminance ranges and a plurality of predetermined light intensities for different focus areas in a frame received from a camera;
communicating, by a microprocessor, with a lighting instrument including a light source, the memory, and the camera;
receiving, by the microprocessor, a frame of a recording area from the camera;
selecting, by the microprocessor, a focus area in the frame;
determining, by the microprocessor, a luminance range of the focus area using one of the plurality of luminance ranges stored in the memory;
constructing, by the microprocessor, a brightness representation of the frame;
determining, by the microprocessor, a location in the brightness representation that corresponds to the focus area;
determining, by the microprocessor, luminance of the determined location;
comparing, by the microprocessor, the determined luminance of the determined location with the determined luminance range of the focus area; and
adjusting, by the microprocessor, light intensity of the light source to one of the plurality of predetermined light intensities stored in the memory.

13. The method of claim 12, further comprising determining, by the microprocessor, that the determined luminance is outside the determined luminance range.

14. The method of claim 13, wherein the step of adjusting light intensity of the light source to the one of the plurality of predetermined light intensities stored in the memory is executed in response to determining that the determined luminance is outside the determined luminance range.

15. The method of claim 12, further comprising communicating, by the microprocessor, with a distance sensor configured to measure distance between the recording area and the distance sensor.

16. The method of claim 15, further comprising:
activating, by the microprocessor, the light source to emit light at an intensity on the recording area without considering a distance measurement from the distance sensor;
receiving, by the microprocessor, a distance measurement from the distance sensor to a subject in the recording area; and
adjusting, by the microprocessor, the emitted light intensity by the light source to another light intensity based on the distance measurement from the distance sensor to the subject in the recording area.

17. A non-transitory computer readable medium storing computer executable instructions that, when executed by a microprocessor, performs a method for operating a lighting system comprising:
storing, in memory, data comprising a plurality of luminance ranges and a plurality of predetermined light intensities for different focus areas in a frame received from a camera;
communicating, by a microprocessor, with a lighting instrument including a light source, the memory, and the camera;
receiving, by the microprocessor, a frame of a recording area from the camera;
selecting, by the microprocessor, a focus area in the frame;
determining, by the microprocessor, a luminance range of the focus area using one of the plurality of luminance ranges stored in the memory;
constructing, by the microprocessor, a brightness representation of the frame;
determining, by the microprocessor, a location in the brightness representation that corresponds to the focus area;
determining, by the microprocessor, luminance of the determined location;
comparing, by the microprocessor, the determined luminance of the determined location with the determined luminance range of the focus area; and
adjusting, by the microprocessor, light intensity of the light source to one of the plurality of predetermined light intensities stored in the memory.

18. The medium of claim 17, wherein the executable instructions that, when executed by a microprocessor, perform a method further comprising determining, by the microprocessor, that the determined luminance is outside the determined luminance range, and wherein the step of adjusting, by the microprocessor, light intensity of the light source to the one of the plurality of predetermined light intensities stored in the memory is executed in response to determining that the determined luminance is outside the determined luminance range.

19. The medium of claim 17, wherein the executable instructions that, when executed by a microprocessor, perform a method further comprising communicating, by the microprocessor, with a distance sensor configured to measure distance between the recording area and the distance sensor.

20. The medium of claim 19, wherein the executable instructions that, when executed by a microprocessor, perform a method further comprising:
- activating, by the microprocessor, the light source to emit light at an intensity on the recording area without considering a distance measurement from the distance sensor;
- receiving, by the microprocessor, a distance measurement from the distance sensor to a subject in the recording area; and
- adjusting, by the microprocessor, the emitted light intensity by the light source to another light intensity based on the distance measurement from the distance sensor to the subject in the recording area.

* * * * *